United States Patent
Morrison et al.

(10) Patent No.: US 9,491,122 B2
(45) Date of Patent: Nov. 8, 2016

(54) SYSTEMS AND METHODS FOR SERVER AND SWITCH FAILOVER IN A BLACK CORE NETWORK

(71) Applicant: Raytheon Company, Waltham, MA (US)

(72) Inventors: Dennis A. Morrison, Hampstead, NH (US); Nicholas R. Desany, Melrose, MA (US); Allan R. Peckham, Exeter, RI (US); Donald L. Chaloupka, Wakefield, RI (US)

(73) Assignee: Raytheon Company, Waltham, MA (US)

( * ) Notice: Subject to any disclaimer, the term of this patent is extended or adjusted under 35 U.S.C. 154(b) by 75 days.

(21) Appl. No.: 14/516,762

(22) Filed: Oct. 17, 2014

(65) Prior Publication Data

US 2016/0112350 A1   Apr. 21, 2016

(51) Int. Cl.
| | |
|---|---|
| H04L 12/66 | (2006.01) |
| H04L 12/939 | (2013.01) |
| H04L 12/707 | (2013.01) |
| H04L 12/703 | (2013.01) |

(52) U.S. Cl.
CPC .............. *H04L 49/557* (2013.01); *H04L 45/22* (2013.01); *H04L 45/28* (2013.01)

(58) Field of Classification Search
CPC ..... H04L 45/28; H04L 12/437; H04L 47/10; H04L 12/28
See application file for complete search history.

(56) References Cited

U.S. PATENT DOCUMENTS

| | | |
|---|---|---|
| 4,392,241 A | 7/1983 | Hurst |
| 7,308,713 B1 | 12/2007 | Jardin et al. |
| 2003/0028625 A1* | 2/2003 | Sanjeev .................. H04L 12/66 709/220 |

(Continued)

OTHER PUBLICATIONS

Boland, Rita, "Marines Revolutionize Network in Southwest Afghanistan", *Signal Magazine* [online]. (May 2011), 6 pgs.

(Continued)

*Primary Examiner* — Andrew Lee
(74) *Attorney, Agent, or Firm* — Schwegman Lundberg & Woessner, P.A.

(57) ABSTRACT

A black core network system and method, wherein the system includes a ciphertext network, a server having a bonding module and a plurality of network interfaces, a plurality of encryptor devices and one or more routers, wherein each router is connected through one or more of the server network interfaces to the server and through one or more encryptor devices to the ciphertext network. The server establishes, in the bonding module, a server gateway for each server network interface, selects a first network interface as primary link and a second server network interface as backup link, and sends routing metric information out through the primary link and the backup link, wherein sending includes sending metric information indicating that the cost of routing through the primary link is less than the cost of routing through the backup link. When the server receives, from one of the one or more routers, an indication that there is a link failure on the primary link, the server manipulates the server gateway for the second server network interface to direct traffic for the primary link out the second server network interface, wherein the second link becomes the new primary link and the server sends routing metric information out through the new primary link to the second router.

27 Claims, 15 Drawing Sheets

(56) References Cited

U.S. PATENT DOCUMENTS

| | | | |
|---|---|---|---|
| 2003/0088698 A1* | 5/2003 | Singh | H04L 12/4641 709/239 |
| 2005/0210139 A1* | 9/2005 | Hightower | H04L 29/12009 709/227 |
| 2005/0283566 A1 | 12/2005 | Callaghan | |
| 2006/0213766 A1* | 9/2006 | You | C23F 13/04 204/228.1 |
| 2007/0263532 A1* | 11/2007 | Mirtorabi | H04J 3/14 370/228 |
| 2009/0019281 A1* | 1/2009 | Winslow | H04L 63/0272 713/162 |
| 2009/0219938 A1* | 9/2009 | So | H04L 45/00 370/395.3 |
| 2010/0185753 A1* | 7/2010 | Liu | H04L 65/4084 709/219 |
| 2013/0163412 A1* | 6/2013 | Hughes | H04W 40/04 370/228 |
| 2014/0075025 A1* | 3/2014 | Stanforth | H04W 48/14 709/225 |
| 2014/0313882 A1* | 10/2014 | Rucker | H04W 4/005 370/219 |
| 2015/0023352 A1* | 1/2015 | Yang | H04L 12/462 370/392 |
| 2015/0124960 A1 | 5/2015 | Morrison et al. | |
| 2015/0350059 A1* | 12/2015 | Chunduri | H04L 45/18 370/238 |

OTHER PUBLICATIONS

Carr, David F., "Building a protective black core for the Global Information Grid", [online]. Defense Systems. Retrieved from the Internet: <URL: http://defensesystems.com/Articles/2009/09/02/Cyber-Defense-Black-Core.aspx?p=1, (Sep. 9, 2009), 3 pgs.

Morrison, Dennis A., et al., "Black Core Network System and Method", U.S. Appl. No. 14/073,436, filed Nov. 6, 2013, 53 pgs.

Tarr, Julie, et al., "Defining the Gig Core", *IAnewsleter*, vol. 11, No. 2, (Summer 2008), 4-9.

Walker, Amy, "Uncovering the colorless core of the Army's network", [online]. [archived May 13, 2012]. Retrieved from the Internet: <URL: https://web.archive.org/web/20120513015526/http://www.army.mil/article/78976/>, (May 1, 2012). 3 pgs.

"U.S. Appl. No. 14/073,436, Non Final Office Action mailed Nov. 4, 2015", 18 pgs.

"U.S. Appl. No. 14/073,436, Notice of Allowance mailed Mar. 30, 2016", 12 pgs.

"U.S. Appl. No. 14/073,436, Response filed Oct. 14, 2015 to Restriction Requirement mailed Aug. 14, 2015", 14 pgs.

"U.S. Appl. No. 14/073,436, Response filed Mar. 4, 2016 to Non-Final Office Action mailed Nov. 4, 2015", 21 pgs.

"U.S. Appl. No. 14/073,436, Restriction Requirement mailed Aug. 14, 2015", 7 pgs.

\* cited by examiner

SYSTEMS AND METHODS FOR SERVER AND SWITCH FAILOVER IN A BLACK CORE NETWORK

GOVERNMENT RIGHTS

This invention was made with Government support under Government Contract Number N00024-05-C-5346, awarded by the Department of Defense. The Government has certain rights in this invention.

BACKGROUND

The Global Information Grid (GIG) is an attempt to integrate all information systems, services and applications in the department of Defense into one seamless network. One architectural approach that has been proposed for constructing the GIG is a black core network.

The promise of the black core network has eluded tactical network designers for years. Stymied by the lack of infrastructure support, immature technology and politics, many initiatives have witnessed limited success or have failed outright. A key component in the realization of a black core network is an encryptor such as the High Assurance Internet Protocol Encryptor (HAIPE). A HAIPE device typically serves as a secure gateway which, when paired with another HAIPE device, allows two enclaves to exchange data over an untrusted or lower-classification network. It is customary to refer to the user networks that operate within each enclave as plaintext (PT) or red networks, while a black network is one that transports encrypted traffic, or black traffic. Black networks are also known as Ciphertext (CT) networks. Although existing HAIPE devices have been used successfully to bulk encrypt data on a point-to-point basis, to date they lacked the ability to fully support a Black Core network.

Fault tolerance is an issue in pure black core networks. Because of that, successful black core networks to date have been limited to networks of networks based on striping techniques. One such striping approach is described by Tarr et al. in "Defining the GIG Core", http://iac.dtic.mil/csiac/download/Vol11_No2.pdf. Striped cores, however, are more complicated, driving up the cost of the network, increasing latency, increasing vulnerability to eavesdropping and decreasing reliability.

High Availability for server applications is often achieved through the use of redundant components including power supplies, memory (hard drives) and network interfaces. In the event of a single component failure, the redundant component takes over. Of the aforementioned components, the server's network interfaces often require additional support inside and outside of the server to enable a reliable failover mechanism. To date, the GIG remains a network of networks using IPsec striping techniques. The IPSec devices do not possess the capabilities to facilitate end-to-end rapid failover/recovery. What is needed are network link failover mechanisms for servers connected to black core networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Transporting classified (Red) data over an unclassified (Black) network requires a transformation of Red data into Black data through the use of an encryption device (e.g., a High Assurance Internet Protocol Encryptor (HAIPE)). Once encrypted, the classified data can be co-mingled and routed over the Black network from source to destination. This is the basis and key to creating the Black Core Network. However, simply encrypting data and transporting it from source to destination does not completely satisfy the requirements of a Black Core network.

A Black Core network, to be useful, provides ample bandwidth to carry ordinary unclassified traffic and encrypted (black) traffic, operates seamlessly in both the Black and Red domains, providing low latency point-to-point and point-to-multipoint communications, self-heals in the event of an equipment malfunction or a link failure and provides network management in both the Red and Black portions of the network.

In a Black Core Network, signaling between the Black Network and the Red Networks is accomplished through devices such as HAIPE devices. While the technology to encrypt IP traffic at various classification levels has existed since the early 2000s, the capability to rapidly and dynamically reroute data around network faults in the both the Black Core and at the interface of the Red Network was not possible. A series of cooperative signaling mechanisms that can be used separately or together to facilitate rapid failover in black core networks is described in BLACK CORE NETWORK SYSTEM AND METHOD, U.S. Ser. No. 14/073,436, filed 6 Nov. 2013 (hereinafter the "436 application"), the description of which is incorporated herein by reference.

Figure 1:
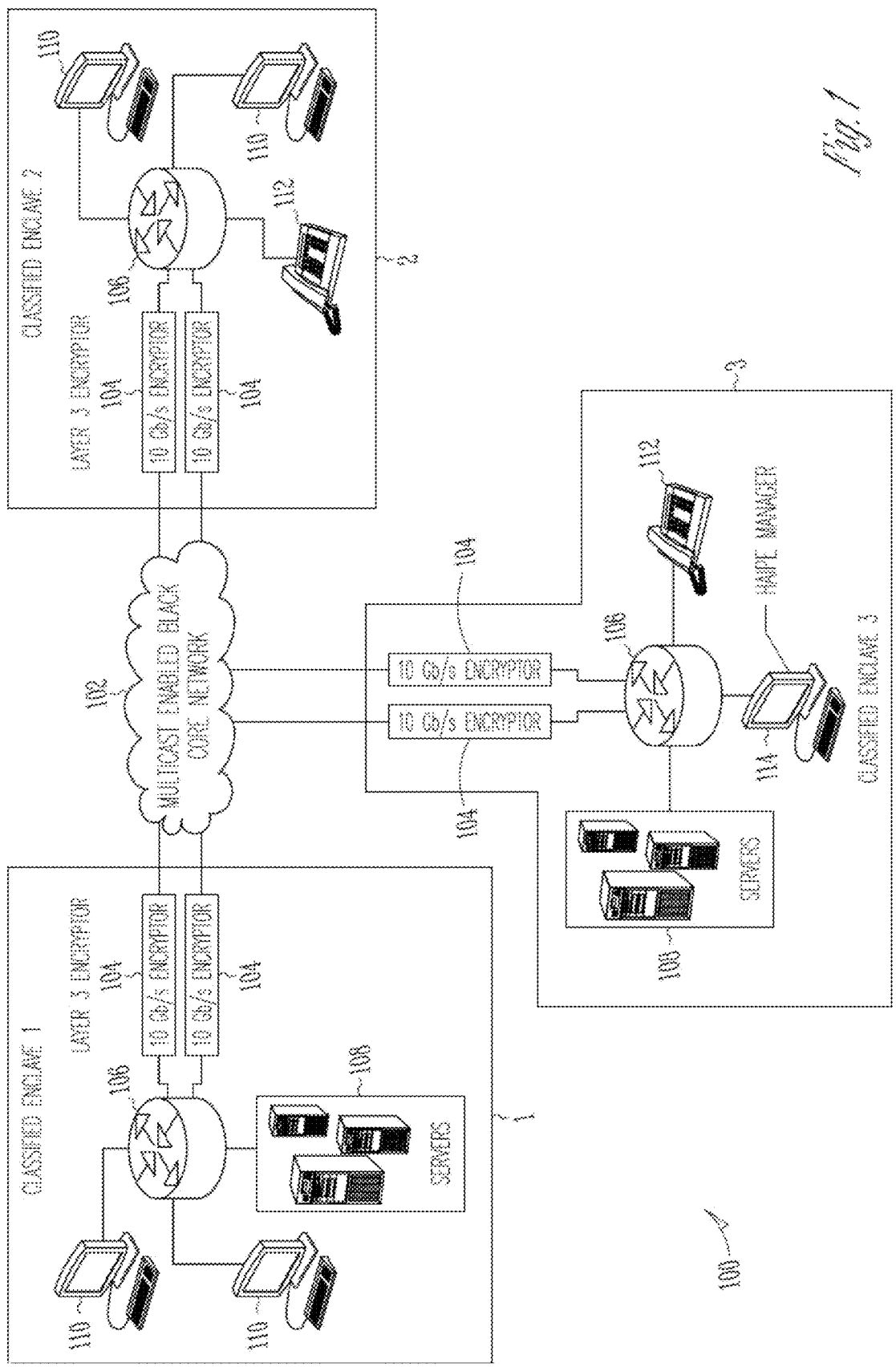
FIG. 1 illustrates a computer network.

A computer network 100 is shown in FIG. 1. In the embodiment shown, traffic inside each enclave is plaintext, while traffic between data enclaves is ciphertext. In the example network shown in FIG. 1, ciphertext network 102 transfers encrypted traffic between each of data enclaves 1-3 via encryptors 104. In one example embodiment, ciphertext network 102 is a multicast-enabled black core network encrypted using Type 1 encryption. Type 1 encryption is encryption classified or certified by the National Security Agency (NSA). It must be developed using established NSA business practice and must contain NSA approved algorithms. Other types of encryption can be used as well, including IPsec encryption (but, in some embodiments, without multicast).

Each data enclave (or red network) includes one or more computing devices connected through a router 106 to one or more encryptors 104. In some embodiments, information assurance and data integrity are achieved through the use of data encryptors, such as the NSA-approved Type 1 High Assurance Internet Protocol Encryptors (HAIPE). Black core networks can be achieved as well using commercially available network routers or switches, commercial encryption devices and high assurance guards (for cross classification communications).

In the example embodiment shown in FIG. 1, the computing devices include devices such as servers 108, workstations 110, IP telephones 112 and HAIPE managers 114.

In the networks 100 shown in FIG. 1, redundant HAIPE devices 104 are installed within each data enclave in order to provide alternate data paths into each enclave. In the example shown in FIG. 2, a data path may fail due to, for example, a link failure between the workstation 110 and the router 106, a failure in PT link 128 or a failure in CT link 130. In some embodiments, HAIPE devices 104 include a CT-to-PT Disable mechanism for reflecting a failure on the CT link over to the PT link. Examples of such a mechanism are described in the '436 application, the descriptions of which are incorporated herein by reference.

CT-to-PT Disable

Figure 2:
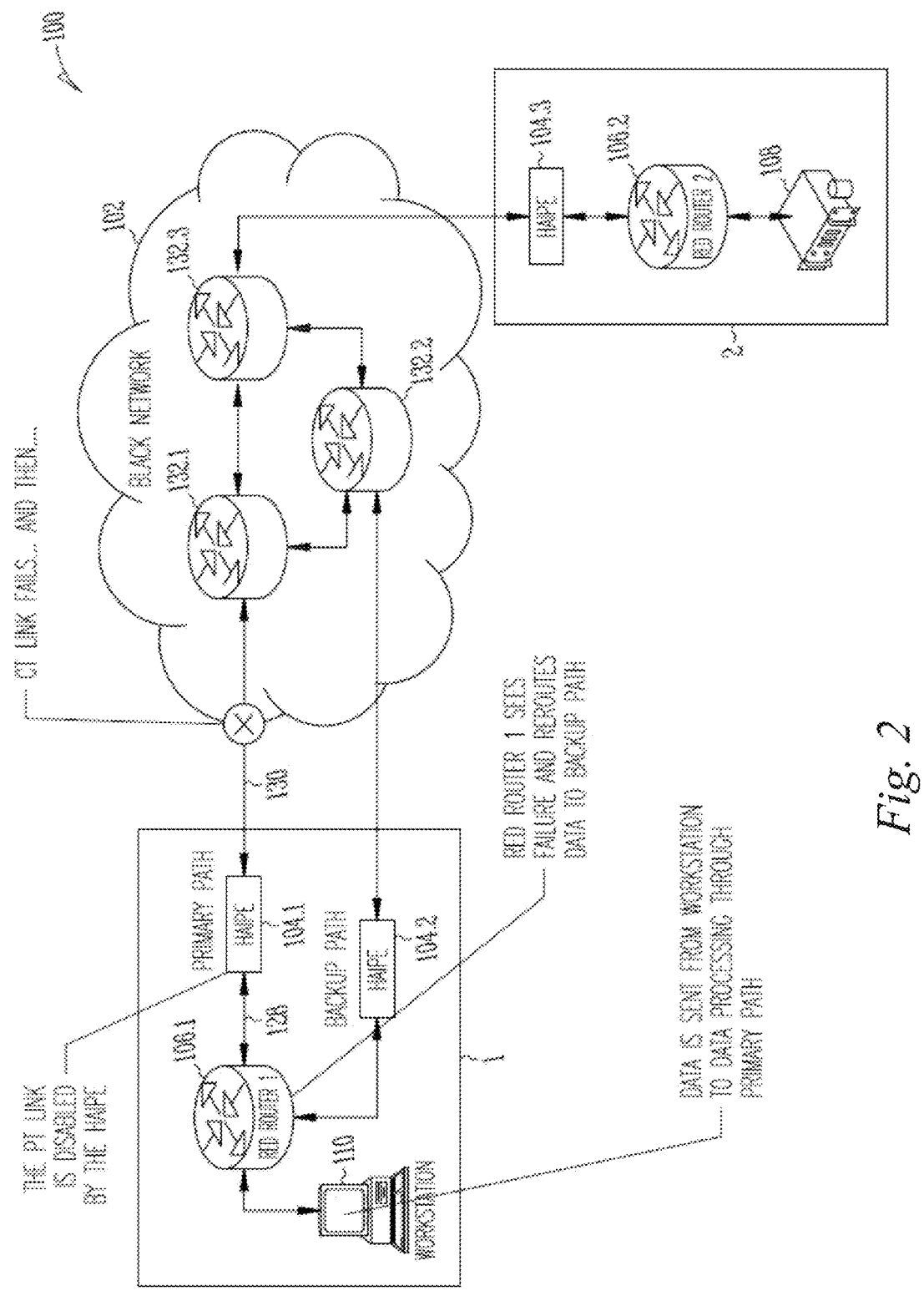
FIG. 2 illustrates an example embodiment of CT-to-PT Disable.

An example of CT-to-PT Disable is shown in FIG. 2. In the example embodiment shown in FIG. 2, the CT Link 130 connecting HAIPE 104.1 to an edge router 132.1 in black core network 102 has failed, blocking communication on the primary data path between server 108 and workstation 110. Red router 106.1 is, however, unaware that CT link 130 is no longer working. As shown in FIG. 2, data sent to server 108 from workstation 110 is routed on the primary data path until it reaches HAIPE 104.1 and cannot be forwarded due to the failure of CT link 130. As noted above, in prior systems, system 100 had no efficient way of resolving this type of failure.

In the example embodiment shown in FIG. 2, however, when HAIPE 104.1 detects the failure of ciphertext link 130, it disables plaintext link 128, reflecting the failure of CT link 130 onto PT link 128. Red router 106.1 sees the failure of plaintext link 128 and reroutes network traffic to the backup data path through HAIPEs 104.2 and 104.3 and edge routers 132.2 and 132.3 to server 108. In some embodiments, a separate return path mechanism is required to establish full two-way traffic. In some such embodiments, the ICMP-DU signal is used to establish the separate return path as will be described below.

Dynamic Topology Table Updates

In traditional networks, routing protocols are employed to derive and synchronize the network topology across a group of routers in a network. Routing protocols such as RIP, OSPF, EIGRP or any equivalent protocol are often employed to achieve this level of synchronization.

Although in most embodiments encryptors 104 themselves are not routers, they do, in some cases, act like pseudo routers. That is, in some embodiments, they provide a list of end PT routes to a local PT router (such as router 106) and they receive and interpret protocol update messages to populate a local plaintext network topology table 136 (such as the Local Enclave Prefix Table (LEPT) in HAIPE encryptors). Plaintext network topology tables include route metrics associated with each route. The route metrics indicate a preferred path.

Figure 3:
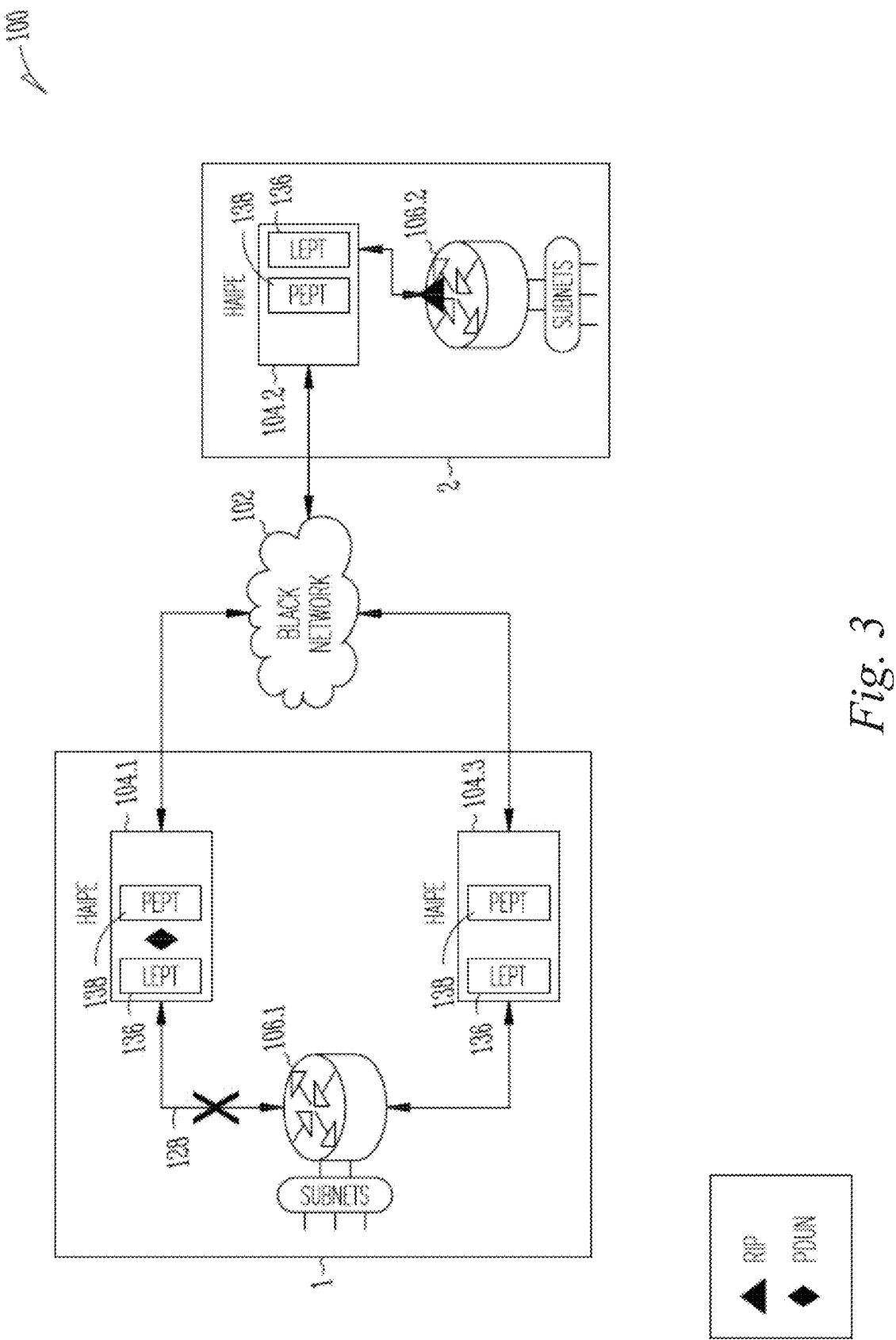
FIG. 3 illustrates dynamic routing topology updates.

One such embodiment is shown in FIG. 3. In an early implementation of the HAIPE version 3.1.2 software, routing metrics for subnets protected by the HAIPE were not transmitted to any peer HAIPEs 104. Peer HAIPEs would only receive the "static" administrative route metric provisioned by the user when the HAIPE was first configured. That static administrative information would be stored in a ciphertext network topology table 138 (such as a Peer Enclave Prefix Table (PEPT)). If a link failed or a routing metric changed in the Red network, the change would not, therefore, be transmitted to the peer HAIPEs.

In one example HAIPE embodiment, each encryptor 104 includes a way of forwarding learned route metrics to peer HAIPEs when they respond to HAIPE discovery and failover protocol messages (Peer HAIPE Destination Unreachable Notification (PDUN), PROBE, and "TRYME" messages). In some embodiments, topology tables go beyond route metrics to include the routing information itself.

In one such embodiment, as is shown in FIG. 3, if the PT link 128 on a HAIPE 104 is disconnected or disabled, the plaintext network topology table 136 is automatically cleared by HAIPE 104.1. Clearing the plaintext network topology table indicates to the HAIPE 104.1 that it has no routes to the PT side of the network. As a result, if and when a packet is received from another HAIPE destined to the PT routes supported by the subject HAIPE, the subject HAIPE will send a "PDUN" message back to the source HAIPE indicating that the destination is unreachable. The source HAIPE is now responsible to use an alternate route or to send a probe to its peer HAIPEs to discover an alternate path.

In one embodiment, router 106.1 notifies encryptor 104.1 if a path in plaintext network topology table 136 is no longer available, or if the route metrics for that route have changed.

In one such embodiment, if a primary path to a router 106 within the plaintext network is disrupted, the affected router 106 sends a triggered message to the HAIPE 104 indicating that the route metrics for the path through that router 106 have changed. The path may no longer be usable, or the cost of that path may have increased. In some embodiments, the triggered message is a triggered RIP update.

Referring to FIG. 3, in one embodiment, the route metrics are stored in an entry associated with that route within plaintext network topology table 136. If the data path is no longer available, plaintext network topology table 136 is updated to show that the data path is not available. Subsequent transfers to HAIPE 104.1 across network 102 are checked and a determination is made whether a PT route from that encryptor 104 is available. If a route is available, the data packet is forwarded along that route. If, however, no route to the destination is available from that encryptor 104.1, encryptor 104.1 responds with a PDUN in response to the data packet. Source encryptor 104.2 receives the PDUN and attempts to route the packet via an alternate route. In the embodiment shown in FIG. 3, such a route may, for example, be available through encryptor 104.3.

In one embodiment, each encryptor 104 includes a route metrics threshold. In some such embodiments, if the route metric stored in plaintext network topology table 136 is at or above that threshold, the route is treated as unavailable. In one such embodiment, the threshold is set at 16.

In one embodiment, a HAIPE 104 sends a probe via multicast to the other HAIPEs in response to PDUN received from a peer HAIPE to determine available data paths. If an alternate path is available, a HAIPE on the backup path sends a multicast TRYME message, with metrics, to the source HAIPE. The Source HAIPE receives the TRYME message from the HAIPE on the backup path, updates its ciphertext network topology table 138 with the new route metrics, and then sends subsequent data to the path with the lowest route metric.

In the discussion above, a RIP protocol is used to perform red-triggered updates. Other approaches could be used as well. For instance, protocols such as OSPF and EIGRP can be used. The idea is that when a topology change occurs, an update to the encryption unit 104 is initiated assuming it can support that protocol, with the information immediately, so that it can react in real time to changes in network 100.

As noted above, a triggered RIP update occurs when a failed link is detected. In some embodiments, if there is no active traffic, a probe is sent out periodically asking if there are any updates. In some embodiments, each HAIPE responds to the unit that sent the probe. If there are updates HAIPE 104 sends them to its peer HAIPEs in the network. On the other hand, if HAIPE 104 receives a packet, it replies immediately with an indication that that link is down. The HAIPE at the source of the packet then uses another route.

So, in those embodiments, periodic probes and the advertisements occur either automatically as a result of receiving information or on a periodic basis. Triggered updates enhance recovery from failures in HAIPEs 104 by allowing route changes and updates to be shared quickly.

Figure 4:
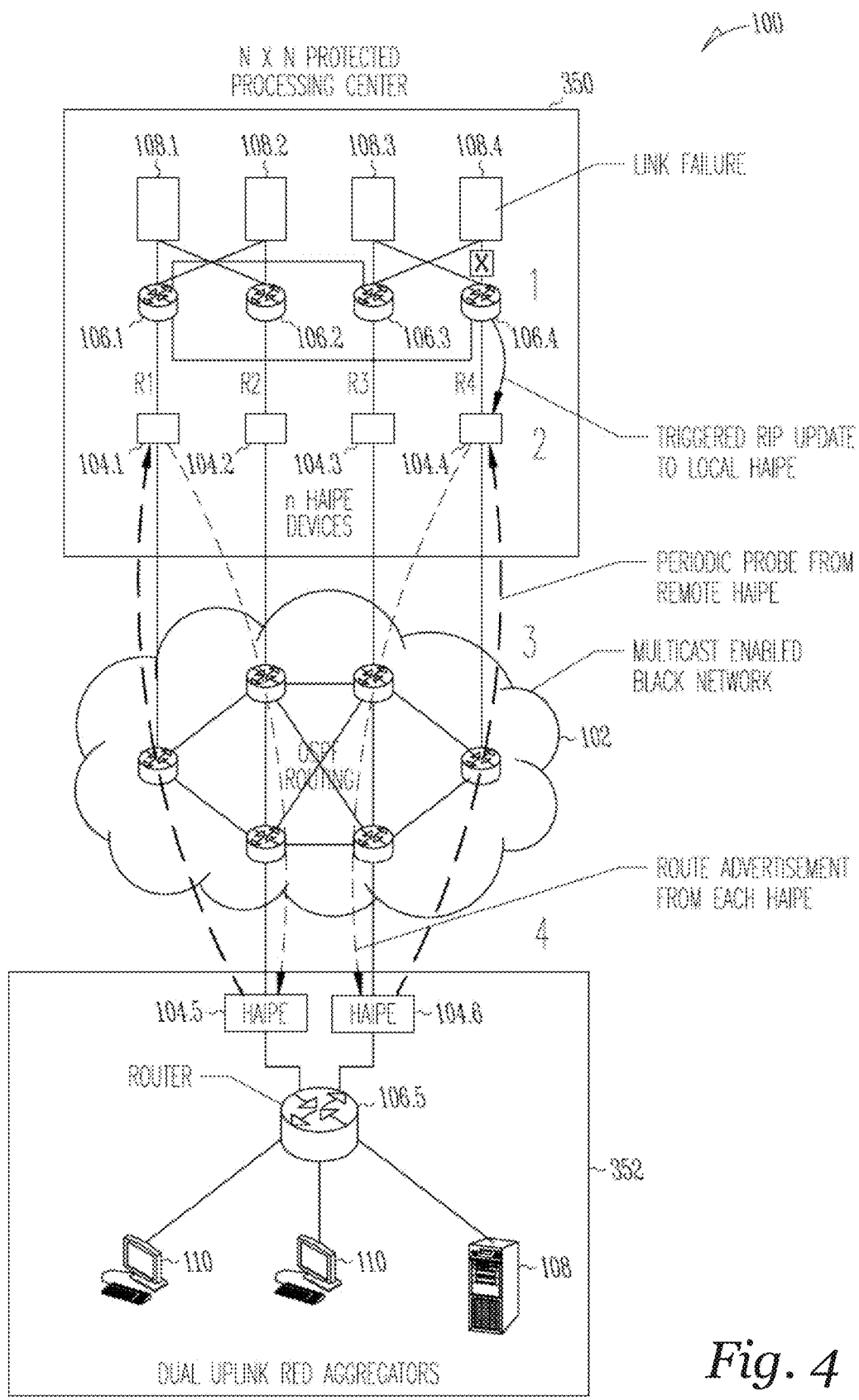
FIG. 4 illustrates another example embodiment of triggered red network topology updates.

Another example embodiment of triggered red network topology updates is shown in FIG. 4. In the example embodiment shown in FIG. 4, processing center 350 is one enclave while enclave 352 is the second enclave. In the example shown in FIG. 4, server 108.4 can be reached via routers 106.3 and 106.4. As shown, the link from router 106.4 to server 108.4 fails. When router 106.4 realizes the link has failed, router 106.4 sends a triggered topology update to HAIPE 104.4. Periodically, HAIPEs 104 on the other side of network 102 send probes to HAIPE 104.4 to obtain route information from the HAIPEs 104 in processing center 350. Peer HAIPEs in processing center 350 respond to the probes with updated routes and probing HAIPEs update their route tables accordingly.

ICMP Destination Unreachable (ICMP-DU)

One of the challenges to achieving rapid failover in a network 100 with a large number of encryption devices 104 is the ability to make a decision in a timely manner based on dynamic network topology changes. For example, in a HAIPE embodiment, using the HAIPE's inherent Peer HAIPE Reachability Detection (PHRD) mechanism requires the sequential loss of three heartbeats. If the HAIPEs were configured to maintain heartbeat signals a rate of one per second, it would take a minimum of three seconds for a remote HAIPE to declare "loss of communications" and to initiate routing network traffic along another viable path.

To mitigate the PHRD performance issues that may occur as the number of peer encryptors in the network are increased, in one embodiment, an Internet Control Message Protocol—Destination Unreachable (ICMP-DU) feature is added to each encryptor 104. The ICMP-DU feature allows encryptors 104 (such as HAIPEs) to detect loss of communication to peer encryptors 104 (e.g., other HAIPEs) as soon as they attempt to send a message to a peer encryptor 104 after a Cipher Text (CT) link failure on that encryptor 104. Because black core network 102 is aware of link state changes, the disruption of a single or multiple CT link 130 to edge router 132 results in a network wide topology change.

Figure 5A:
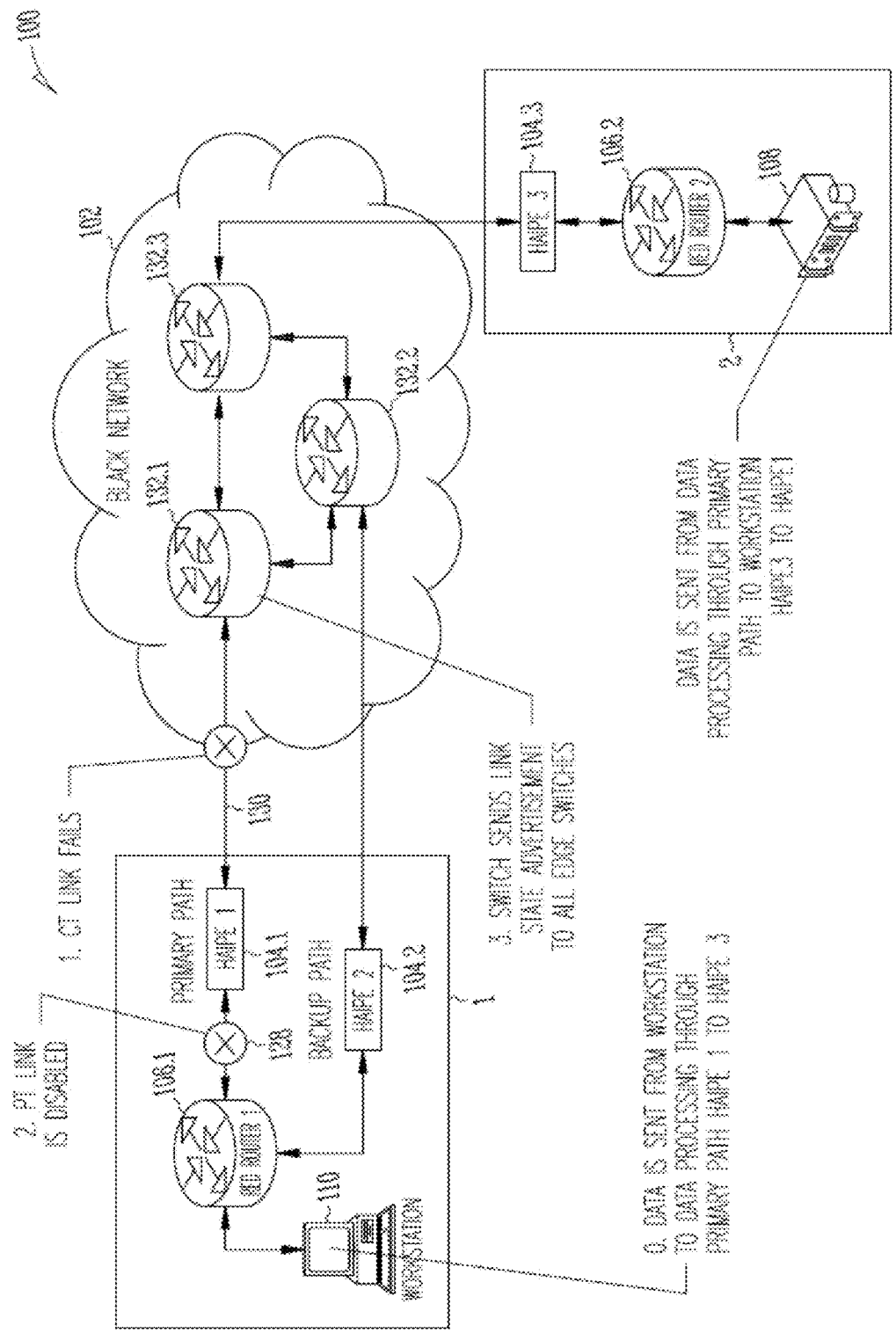
FIGS. 5a and 5b illustrate operation of an example embodiment an Internet Control Message Protocol—Destination Unreachable (ICMP-DU)
Figure 5B:
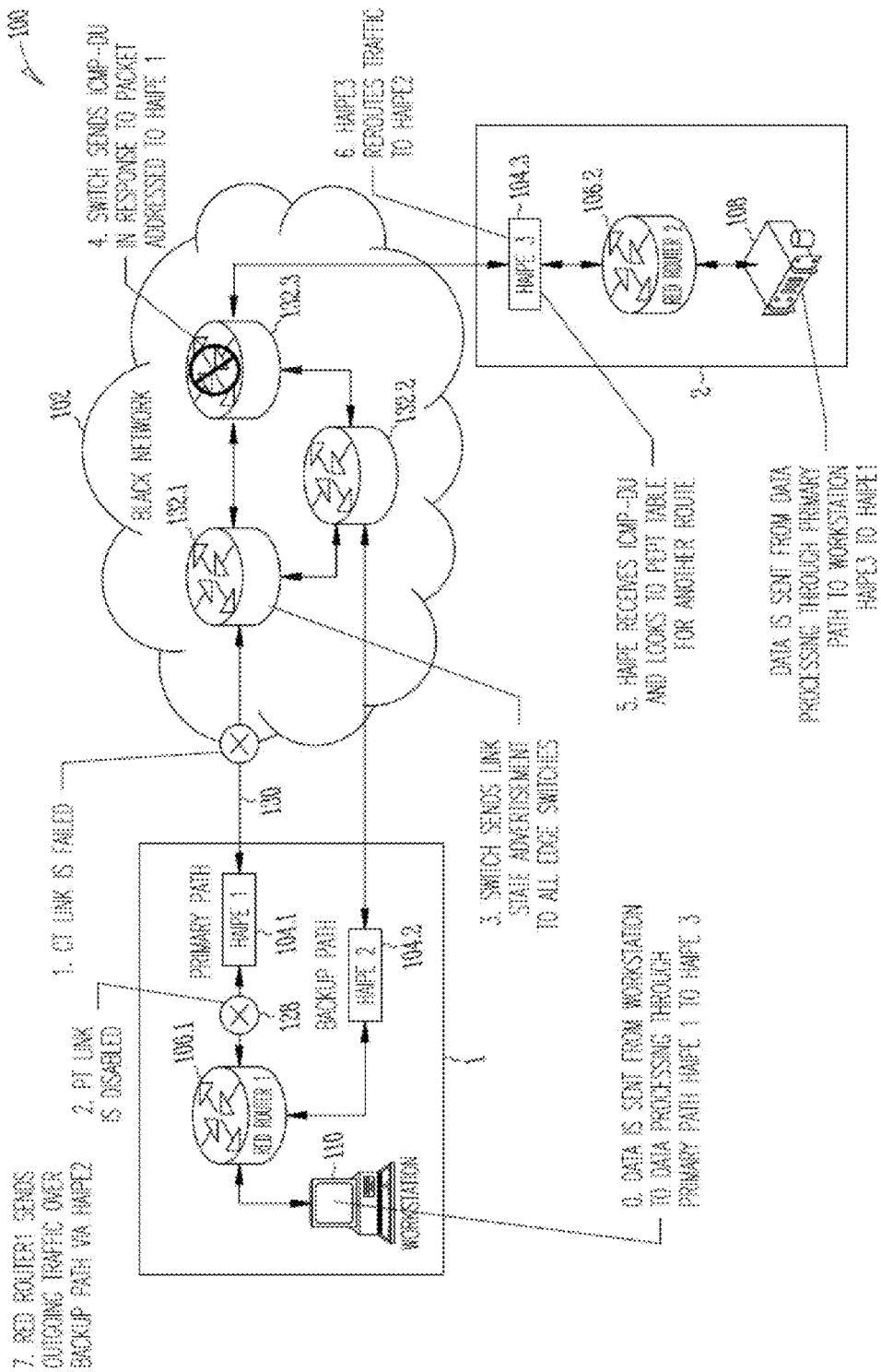

As shown in FIGS. 5a and 5b, a CT link 130 fails. The edge router 132 adjacent the failed CT link 130 detects the failure and, in the embodiment shown, sends a Link State Advertisement to all other edge routers 132 in network 102. Each edge router 132 that receives the Link State Advertisement notes the broken CT link and monitors for subsequent packets addressed to the encryptor 104 associated with that failed CT link 130. If packets addressed to the encryptor 104 associated with that failed CT link 130 are subsequently received at an edge router 132, that edge router responds with an Internet Control Message Protocol—Destination Unreachable (ICMP-DU) to its adjacent encryptor 104. In one embodiment, the packets are then discarded.

When an encryptor 104 receives an ICMP-DU in response to a packet, it knows that the CT link associated with that path has failed. It will then try a different route, if available. In one embodiment, upon receiving ICMP-DU, source HAIPE 104 will route to an alternate HAIPE 104, if an alternate route exists and is reachable in its ciphertext network topology table 138, or will probe to discover an alternate route.

In the example shown in FIGS. 5a and 5b, encryptors 104 are HAIPE 3.1 devices capable of building Peer Enclave Prefix Tables (PEPTs) via Peer Discovery. In some such embodiments, the HAIPEs use a multicast mechanism to perform Peer Discovery.

In the example embodiment shown in FIGS. 5a and 5b, a CT link 130 fails and the adjacent edge router 132.1 detects the failure. Edge router 132.1, on detecting a CT link failure, sends a Link State Advertisement to all other edge routers 132 in network 102. Each edge router 132 that receives the Link State Advertisement notes the broken CT link and monitors for packets addressed to encryptor 104.1 (the encryptor 104 associated with that failed CT link 130). If packets addressed to encryptor 104.1 are subsequently received at, for example, edge router 132.3, that edge router responds with an Internet Control Message Protocol—Destination Unreachable (ICMP-DU) to its adjacent encryptor 104.3. In one embodiment, the packets are then discarded.

When encryptor 104.3 receives an ICMP-DU in response to a packet, it knows that the CT link associated with that path has failed. It then tries a different route, if available. In one embodiment, encryptor 104 receives the ICMP-DU and looks in its PEPT table for another route.

In embodiments in which the encryptors 104 include the CT-to-PT Disable feature, HAIPE 104.1 disables its PT link 128 when it detects the failure of CT link 130. Red router 106 in enclave 1 then starts the process of failing over to the backup path (via HAIPE 104.2).

In one example embodiment, each router 132 that terminates an HAIPE 104 is made aware of the failure of a CT link 130 through the Link State Advertisement. Therefore, as soon as a HAIPE 104 attempts to send a message to a peer that has been disrupted, the edge router 132 sends an ICMP-DU message to the source HAIPE 104 via its adjacent edge router. The significant advantage of this approach is that the HAIPEs learn that they cannot communicate with a peer HAIPE directly from the black network itself rather than relying on missed heartbeats from the Red Network (PHRD). HAIPE 104, therefore, reacts almost immediately to a CT link failure, updates its PEPT 138 for primary route to destination, identifies alternate route, and sends the packet across an alternate route if available. If no route is available, a probe is sent out to the peer HAIPEs in the network in an attempt to discover an alternate route to the packet destination. In addition, this approach scales extremely well as each router 132 in network 102 is informed of network/link outages via the routing protocol Open Shortest Path First (OSPF) or other routing protocol.

It should be apparent that the CT-to-PT disable feature lets red network routers know of a failure in a CT link on outgoing messages, while the ICMP-DU mechanism is used to let HAIPE devices on the other side of the black network know of failures in CT links that are being routed into an enclave. The combination of CT-to-PT disable with PHRD gives one a mechanism for reporting link failure throughout network 100, but it can take seconds to disseminate the information. The combination of CT-to-PT disable and ICMP-DU provides a mechanism for quickly reporting link failure throughout network 100.

At the same time, in some embodiments, ICMP-DU is used without CT-to-PT Disable to report failures in packet transfer due to CT link failure. Application software operating in conjunction with the ICMP-DU mechanism is then used to track down and report CT link failure within the red networks. In one embodiment, network 100 uses a red-side network ping tool on the red network to confirm CT link up or CT link failure. In another embodiment, HAIPE 104 is configured for RIP send and CT link failure is confirmed when there are no learned routes in plaintext topology table 138.

Network Topologies

As can be seen in the examples above, it can be advantageous to have multiple paths into an enclave. If there are at least two paths into and out of an enclave, network 100 can employ the self-healing mechanisms described above to route around the failed path.

It can also be advantageous to make network 102 self-healing without intercession by computing devices within any of the enclaves 1-3 shown in FIG. 1. In some embodiments, this is accomplished by providing redundant paths through network 102. In some such embodiments, network 102 is a mesh network.

The failure detection and reporting mechanism above can be used in a number of topologies, as detailed next. In each of the example topologies, black core network 102 is constructed as a partial mesh and, as such, is inherently self-healing due to the multiple redundant paths between routers.

The Dual-Uplink Red Aggregation Topology shown in FIG. 4 is primarily used to protect classified equipment in an enclave or work center. Equipment such as workstations, Displays and peripherals connect directly to the Aggregation Switch as depicted in FIG. 4. In this network topology, failover is governed by the Aggregation Switch (router 106.5) which is responsible for selecting between two uplinks to HAIPES 104.5 and 104.6. Because the HAIPEs are inserted between the Aggregation Switch and network 102, this topology cannot exclusively utilize black core routing protocols.

It should be noted that with a dual uplink topology, in some embodiments, router 106.5 is configured to allow both links to be simultaneously active and "load share" to ciphertext network 102. However, for this to be successful under all conditions, in some embodiments, the total aggregate uplink bandwidth is engineered for no more than 70-80% of the full bandwidth of a single link. The 20-30% reserve allows for surge bandwidth which is often experienced during startup scenarios and in failure recovery events. In addition, one should be careful with multicast traffic as it is possible to end up receiving the same multicast streams on both links simultaneously and delivering duplicate packets to applications. Configuring dual uplink router 106.5 for primary/backup operation avoids the duplicate multicast packet issue.

In a Dual Uplink Red Aggregation topology such as shown in FIG. 4, the HAIPEs play an active role in the failover process. The following protocols are used depending on the failure mode. For instance, if one of the uplinks between HAIPE 104.5 and the ciphertext network 102 fails (CT Failure), HAIPE 104.5 is responsible for "reflecting" the failure to the Red Side of the HAIPE by disabling the Plain Text (PT or Red) link connected to the Aggregation Switch 106.5. This CT-to-PT reflection mechanism allows the Aggregation Switch to react to the failure by switching the multicast and unicast outgoing traffic to the backup link. At the same time, ICMP-DU is used to report the CT link failure back to any remote HAIPE trying to send incoming unicast traffic through the failed CT link.

In some embodiments, a PT link failure is reported via PDUN, and reported back to the source HAIPE via a PDUN response.

In one example embodiment, router 106.5 moves traffic from the primary path to the secondary link via script and it "joins" all registered multicast groups configured in router 106.5 on behalf of the host applications. In one such embodiment, router 106.5 detects the link failure, fails over to the backup link and sends Routing Information Protocol (RIP) updates to the HAIPE. At the same time, router 106.5 drops subscriptions to multicast groups on the failed link and joins all multicast groups that were subscribed by all hosts connected to router 106.5. All outgoing traffic is then sent out the backup path, and all incoming traffic is received through the backup path.

As mentioned, in some embodiments, the Aggregation Switch (router 106.5 in FIG. 4) is responsible for rejoining the multicast streams. This is done to alleviate the necessity for applications resident on host systems connected to the Aggregation Switch from having to re-join the multicast streams they were previously subscribed to before the link failure. If this process was not followed, each and every application would have to be responsible for the detection of the loss of the multicast traffic and for restarting the multicast traffic by issuing an explicit multicast join request after the failover. What this means to the user systems is that if they were receiving multicast traffic, they would see a slight pause before the streams automatically returned. Services such as streaming video, streaming audio, service location protocols and applications that use multicast to share status and data on a periodic basis would be affected by this type of failure.

Figure 6:
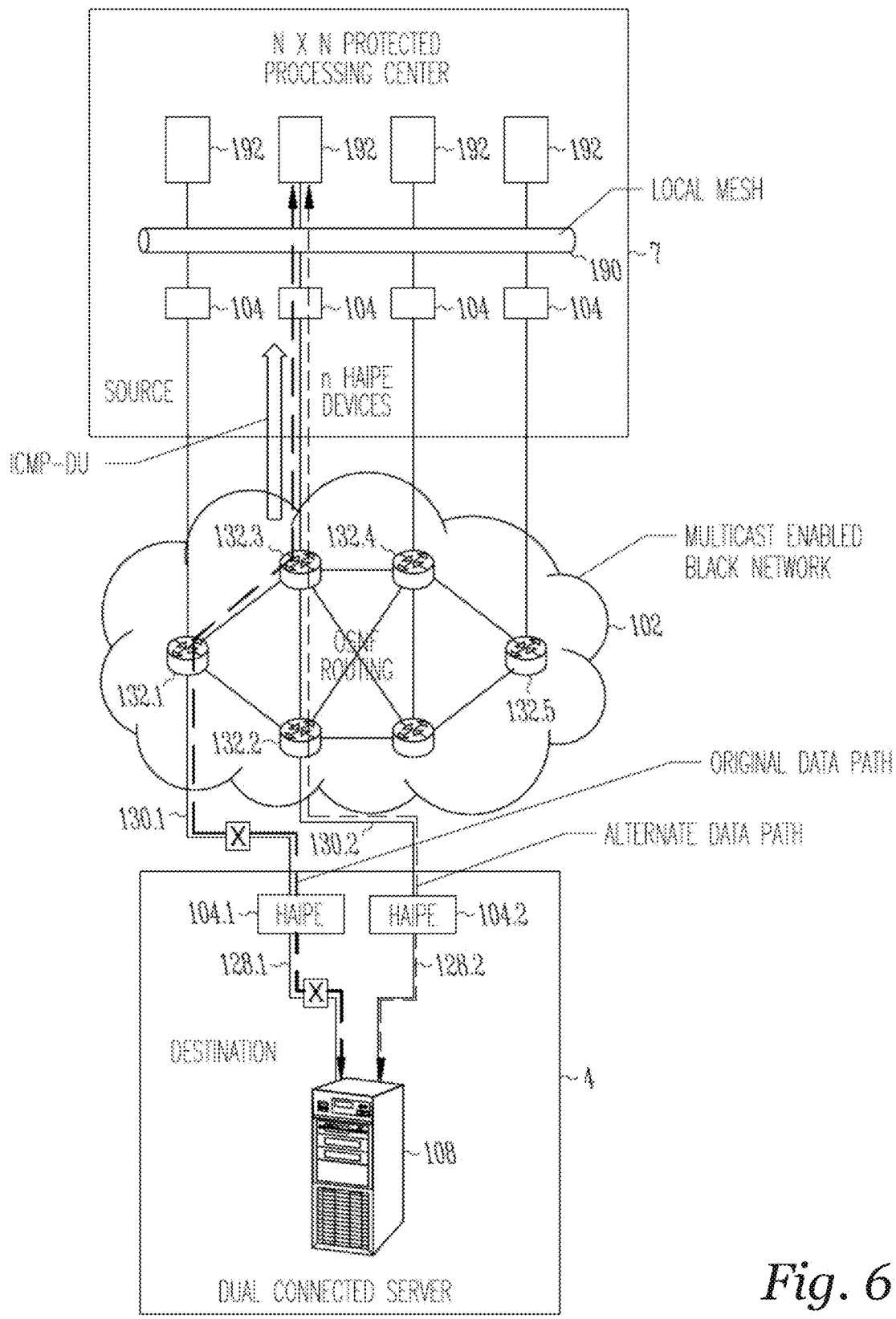
FIG. 6 illustrates a server connected to a CT network via two CT links.

A data enclave 4 having a dual connected server 108 is shown in FIG. 6. In the example shown in FIG. 6, a server 108 is connected to network 102 via a direct connection through encryptors 104 to two CT links 130.1 and 130.2. Server 108 is connected to a first HAIPE 104.1 via a PT link 128.1 connected to a first Ethernet port. Server 108 is connected to a second HAIPE 104.2 via a PT link 128.2 connected to a second Ethernet port.

Server 108 is able to communicate with processing center 7 through four different edge routers 132.1, 132.3, 132.4 and 132.5, providing a lot of redundancy in the data paths between enclaves 4 and 7. In one embodiment, if CT link 130.1 should fail, edge router 132.1 sends a Link State Advertisement (LSA) to all routers 132 in network 102 via, for instance, Open Shortest Path First (OSPF) indicating that CT link 130.1 has failed. Subsequent attempts to write to enclave 4 through CT link 130.1 result in an ICMP-DU message sent to the source HAIPE 104 from the edge router 132 connected to the source HAIPE 104 (in the example shown in FIG. 6, the ICMP-DU message is sent from edge router 132.3). Source HAIPE 104 receives the ICMP-DU message and forwards traffic along an alternate route, if available. At the same time PT link 128.1 is disabled by HAIPE 104.1 as a result of the CT-to-PT Disable. This allows server 108 to switch outgoing traffic to its alternate link through 130.2.

It should be noted that processing center 7 includes four different paths to network 102, and an internal mesh network 190 for communication between each of the servers in processing center 7. The result is a highly redundant network as will be detailed below.

Figure 7:
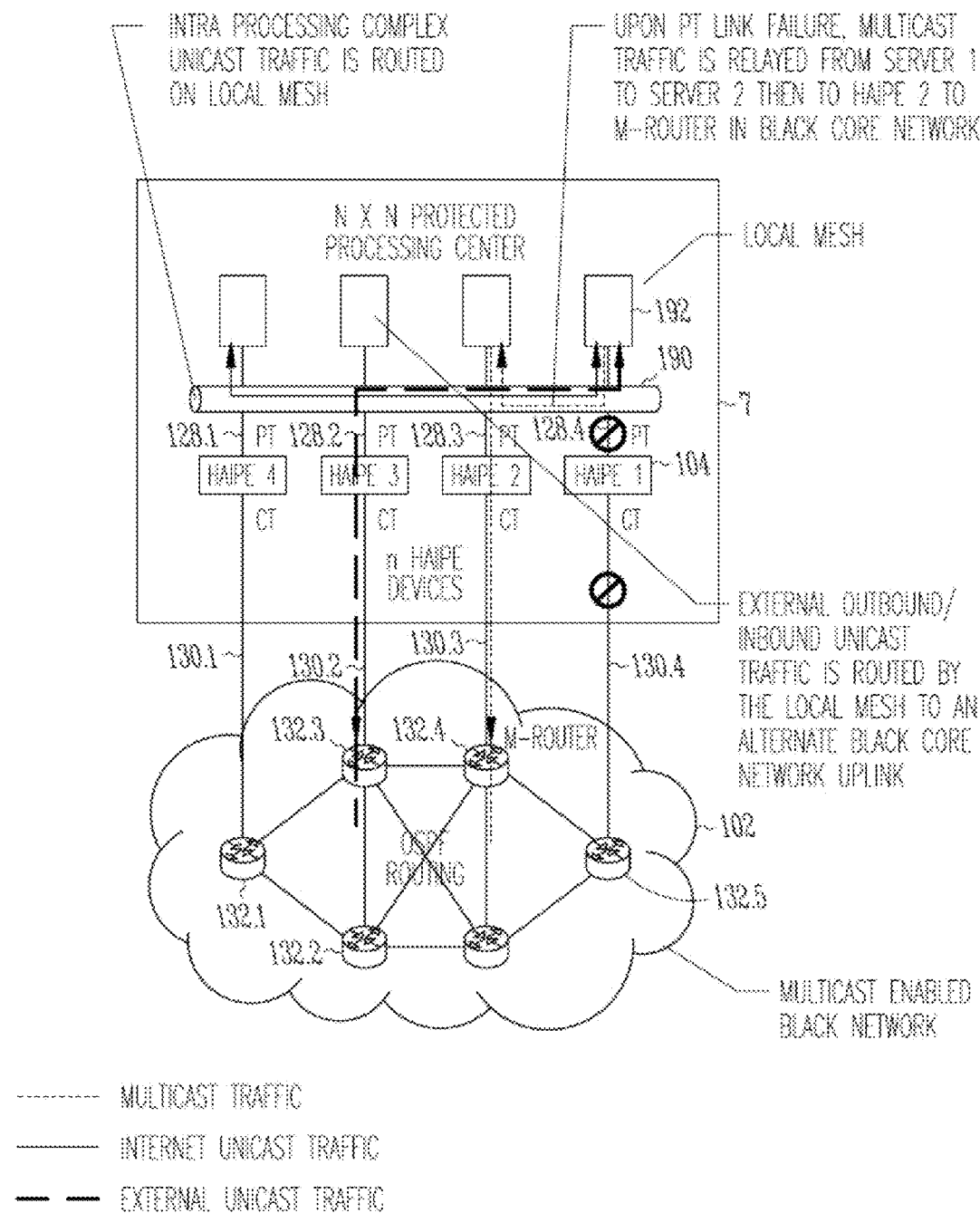
FIG. 7 illustrates one example embodiment of an N×N protected processing center connected to a black core network.

Processing center 7 is shown in FIG. 7. In the example shown in FIG. 7, processing local mesh 190 is used to connect multiple servers 192 together within a single information domain. Mesh 190, in conjunction with the OSPF routing protocol, provides a self-healing capability to cover server complex switch failures as well as fiber ISL failures. In this topology, each server 192 supports a minimum of one connection to the Black Core Network through a HAIPE 104 as illustrated in FIG. 7.

The topology of processing center 7 does not directly participate in any Black Core routing protocols. As such, if a link failure occurs between the HAIPE 104 and the ciphertext network 102 (on CT link 130.4), the HAIPE 104 reflects the failure to the Red (PT) side (PT link 128.4) of the HAIPE via the CT-to-PT disable feature. The processing server switches recognize this failure and, based on the routing protocol routing tables, the data is sent on another path (via another processor chassis) to ciphertext network 102. The term "n×n" protection means that any of the "n" uplinks can be used as an alternate path for any single or multiple failure conditions.

In one embodiment, unicast traffic between processing chassis within the same processing center and information domain traverses processor mesh 190 and does not have to reach the ciphertext network 102 for transport. However, this is not the case for Multicast traffic. Multicast traffic requires one or more Multicast Router(s) (M-Router) and in this instantiation, the M-Routers are in the Black Core. Hence, all Multicast traffic must hit ciphertext network 102.

Failover for Multicast traffic in the processor chassis is accomplished by using a combination of Multicast relay points within the processing mesh 190 and the Multicast relay capability of the HAIPE 104. When CT link 130.4 fails, the processor switch will relay multicast traffic to the next switch that has an operational uplink. Outbound Multicast traffic will flow over this new link and the switch will issue IGMP join messages for the new groups that are being relayed from the first processor switch. The HAIPE, upon receipt of the IGMP joins will relay the join messages to the Black Core "M-Router" for processing as illustrated in FIG. 7.

In some embodiments, failover times within the Processor Mesh Topology of FIG. 7 can be expected to yield sub second performance as the routing is supported by OSPF. Failover of the PT Uplink whether the result of a PT link failure, a CT link failure or a HAIPE failure yields sub second failover time for all data traffic profiles except for incoming unicast traffic. Incoming unicast traffic requires the far end HAIPE to wait for the "PDUN" message from the local HAIPE to update its route tables.

In some embodiments, network 100 includes 10 gigabit encryptors 104 connected across a mesh black core network 102. In some such embodiments the red and the black networks are 10 gigabit networks. The networks use end-to-end security associations to provide the keys used for encryption.

Figure 8:
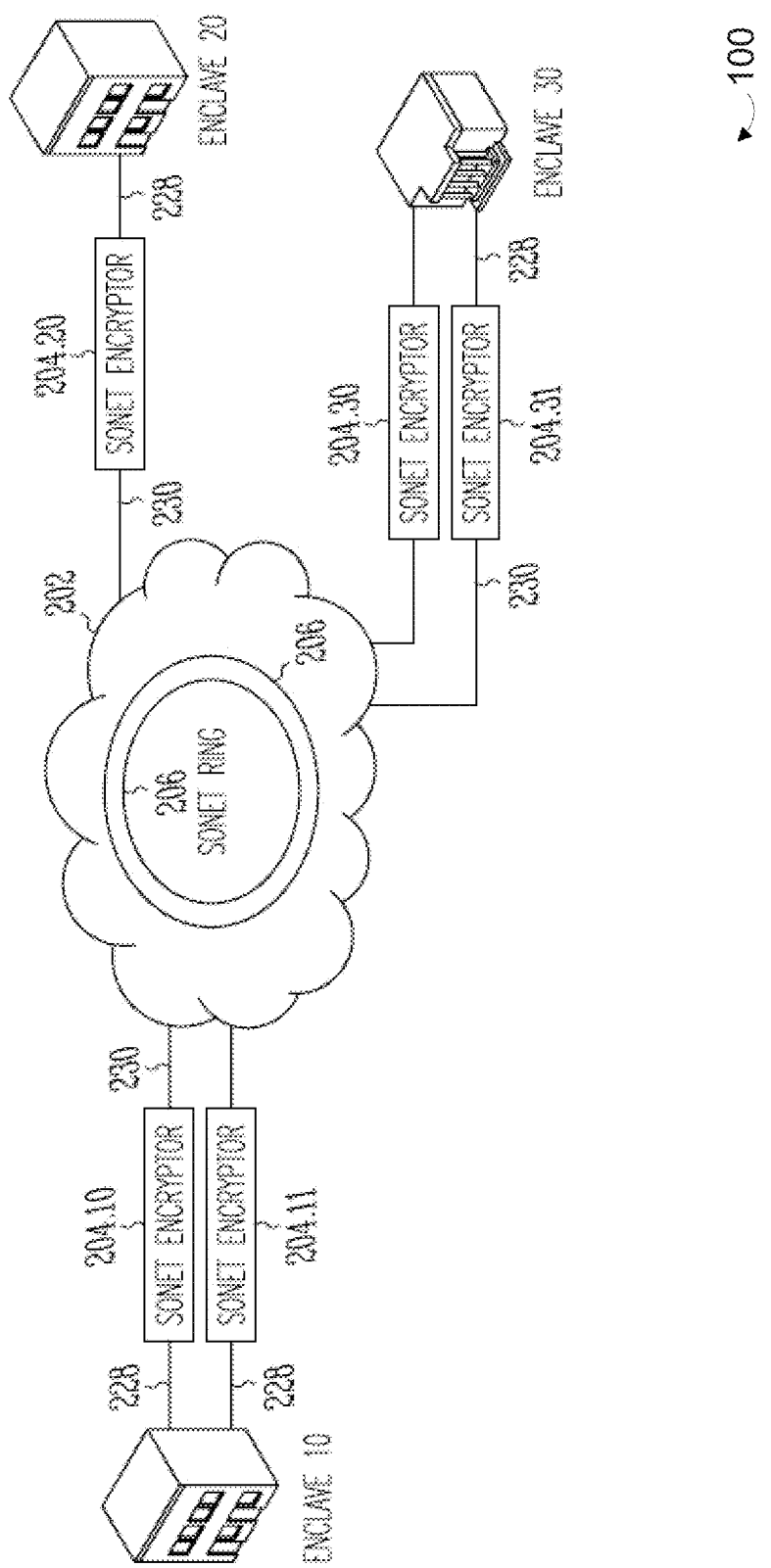
FIG. 8 illustrates one example embodiment of a self-healing SONET-based network.

In some embodiments, encryptors 104 other than HAIPE encryptors are use. In one such approach, the self-healing techniques described above are applied to encryptors based on the Synchronous Optical Network standard (SONET). An example embodiment of a self-healing network 100 based on SONET encryptors 204 is shown in FIG. 8. In the example embodiment shown in FIG. 8, CT network 202 is a SONET network and SONET encryptors are used to protect each enclave. Other network technology can be used as well, including, for example, Ethernet. (In the Ethernet case, encryptors 204 become, for instance, Ethernet link encryptors.)

In the embodiment shown in FIG. 8, ciphertext links 230 are provided to connect each encryptor 204 to ciphertext network 202. In the example embodiment shown in FIG. 8, SONET network 202 is connected through the ciphertext links 230 of one or more SONET encryptors 204 to computing devices within each enclave. In the example embodiment of FIG. 8, two SONET encryptors 204.10 and 204.11 provide redundant pathways through plaintext links 228 into enclave 10, while two SONET encryptors 204.30 and 204.31 provide redundant pathways through plaintext links 228 into enclave 30. Enclave 20 is connected to network 202 through a single plaintext link 228 of encryptor 204.20.

In the example shown in FIG. 8, two rings 206 provide redundancy. In most SONET deployments, rings are used to provide a level of survivability. Some ring topologies use bi-directional line switched rings to provide separate, geographically diverse, data paths. Regardless of the topology, however, once an encryption device such as encryptor 204 is inserted in the system, there is a loss of knowledge as to the state of the SONET link in the network when viewed from the protected enclave. Cooperative signaling mechanisms as described above can be used separately or together within the SONET network to facilitate rapid failover in black core SONET networks. Such an approach is described in the 436 application, the description of which is incorporated herein by reference.

As in the example embodiment discussed for HAIPE networks in FIGS. 5a and 5b above, peer discovery and CT network topology tables can be used effectively to quicken self-healing. In the example shown in FIGS. 5a and 5b, encryptors 104 are HAIPE 3.1 devices capable of building Peer Enclave Prefix Tables (PEPTs) via Peer Discovery. In some such embodiments, HAIPE encryptors 104 use a multicast mechanism to perform Peer Discovery. In some embodiments, similar mechanisms are used in the SONET encryptors 204 of network 202.

In one example embodiment, SONET encryptors 204 implement the plaintext link failure recovery method discussed with respect to FIG. 3 above.

In one example embodiment, SONET encryptors 204 implement the plaintext network route update method discussed with respect to FIG. 3 above.

In addition, in some embodiments, network communication operates seamlessly in both red and black domains for low latency, point to point and multipoint. What that means is, whether sending information just in the black or unclassified or sending encrypted red traffic through network 102, they all have to have the same capabilities in terms of multicast and unicast capabilities. For multicast, a mechanism is used to distribute keys for decrypting the multicast messages at each of their destinations.

In one embodiment, in order to do multipoint communication, network 100 includes a mechanism for sharing the key amongst all subscribers or participants in that multipoint. In one such embodiment, this is done with preplaced keys that get changed on a periodic basis. That allows us to then run multicast in network 100.

High Availability Failover Techniques

The cooperative signaling mechanisms described above are used separately or together to facilitate rapid and dynamic rerouting of data around network faults in the both the CT and the PT sides of Black Core Network 100. "High Availability" failover techniques such as Network Interface Card (NIC) Bonding, Hot Standby Routing Protocol (HSRP), Virtual Router Redundancy Protocol (VRRP), Aggregation Switch Up-link redundancy, and standard gateways can, however, be difficult to implement on Black Core Network 100, even if it implements the signaling mechanisms described above. This is due to the separation between the Black routers and the Red Routers and Servers.

To address this, in some embodiments, software and scripting operate in servers 108 on the Red side of network 100 and Event Triggered Scripts operate in Red Routers/Switches 106 to signal downstream servers, reroute traffic, and automatically update HAIPE routing tables to achieve failover.

Figure 9:
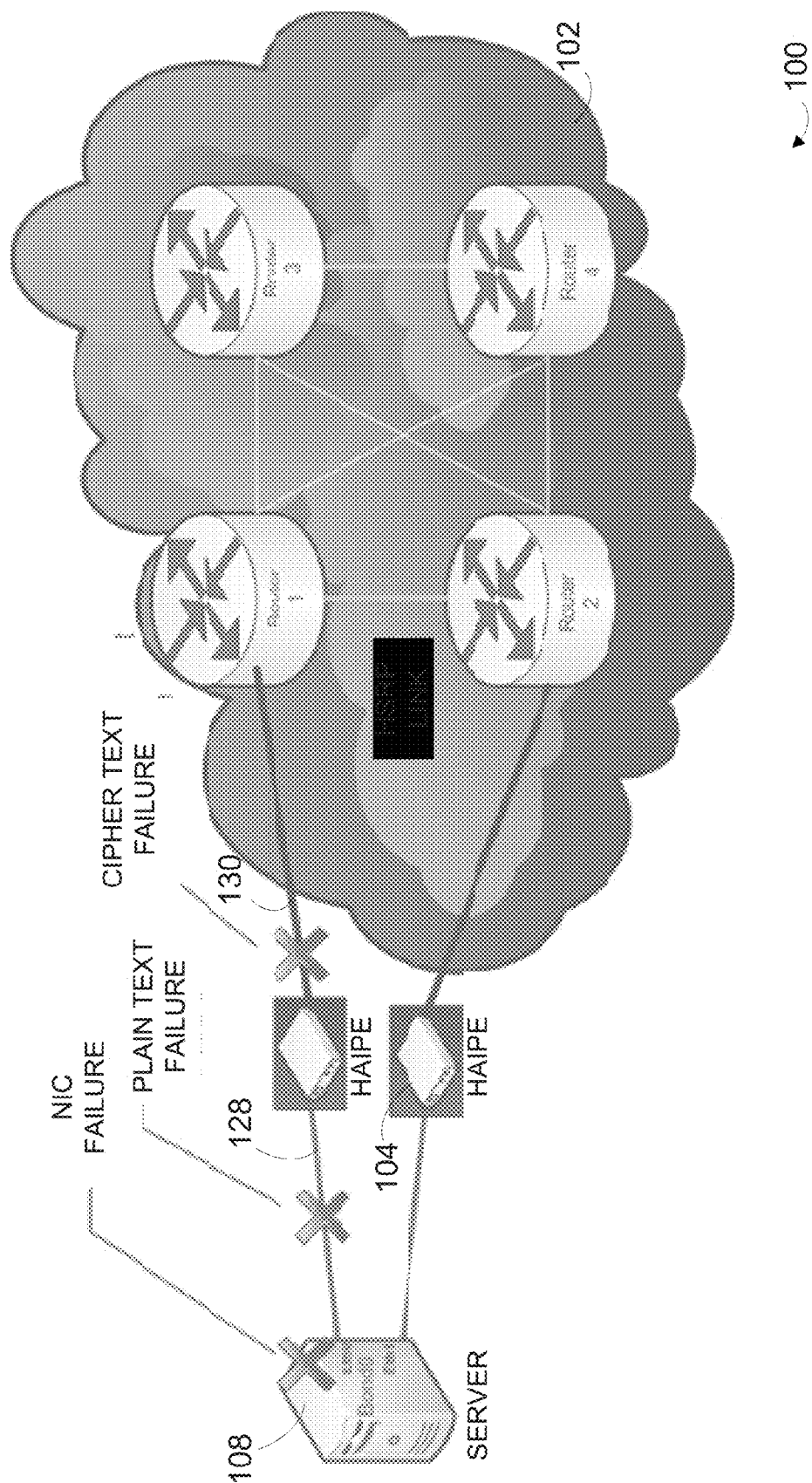
FIG. 9 illustrates a dual connected server topology.

A dual connected server topology is shown in FIG. 9. In the topology of FIG. 9, server 108 is connected via PT links 128 to two separate encryptors 104 and, through encryptors 104, to CT network 102. As shown in FIG. 9, to achieve self healing at the server level, network 100 must cover some or all of PT link failures, CT link failures and Server Network Interface Card (NIC) failures. In one example embodiment, a custom bonding module in server 108 operates with the cooperative mechanism described above to handle such failures. In one such embodiment, PT failures and NIC failures are handled by server 108 and the bonding module (Bond0). Ciphertext failures are handled by the server 108 and the bonding module (Bond0) after being notified of link 130 failure through the CT-to-PT Disable mechanism.

In one embodiment, multi-subnet bonding module (BOND0) operates with a standard bonding module to handle link failures. In one such embodiment, bonding module BOND0 includes software to manipulate routing tables and gateways used by the standard bonding module, provides periodic updates to the HAIPE devices connected to primary and backup links, advertises a virtual network address for external applications to communicate with applications on the server, determines the links 128 that are available to use, and responds to link failures.

Figure 10:
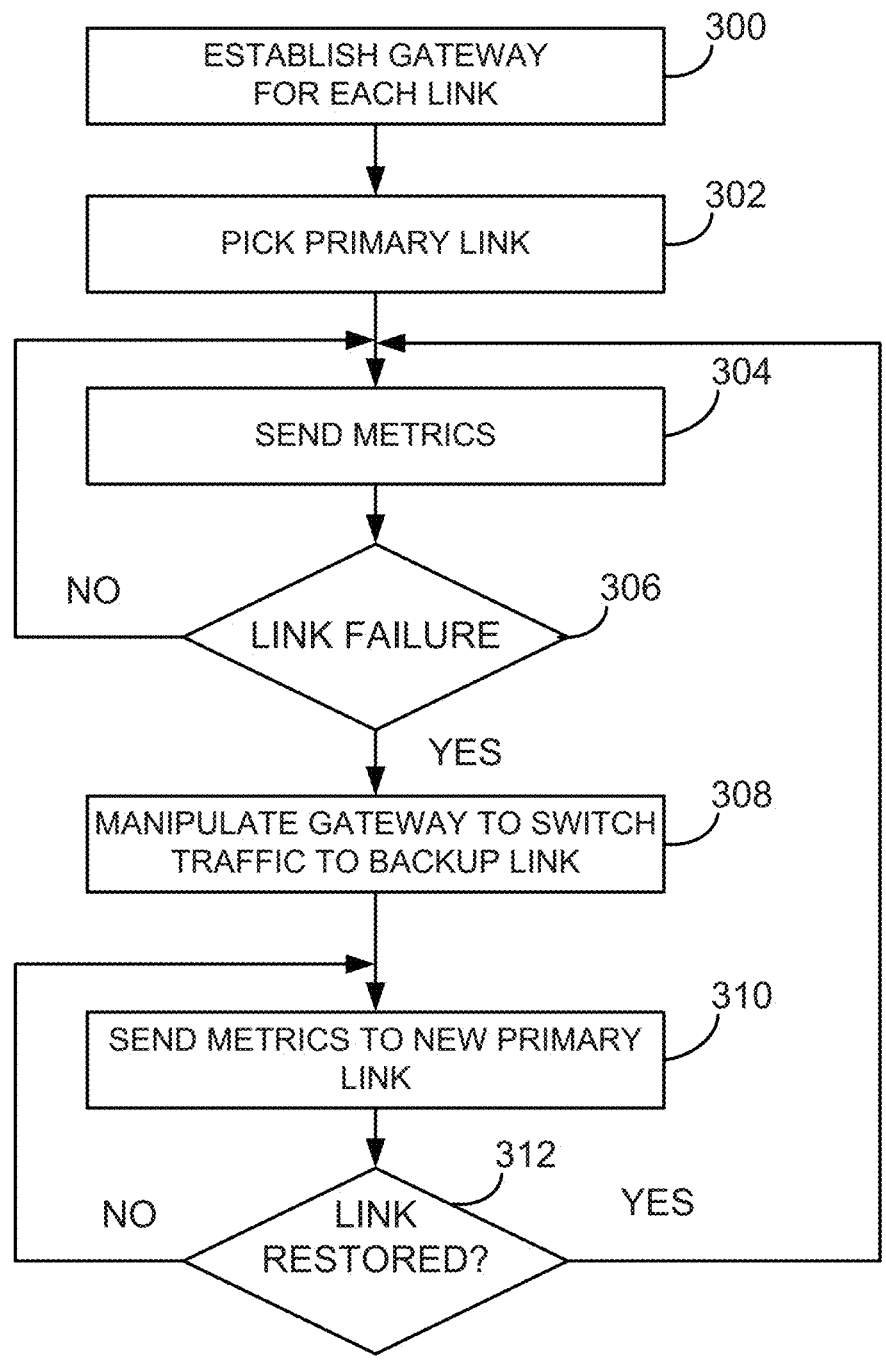
FIG. 10 illustrates one example method of recovering from link failures in a dual connected server topology.

In one such embodiment, upon startup, routing software (multi-subnet bonding) module (Bond0) determines the health status of the network links. As can be seen in FIG. 10, if the links are active, a virtual gateway is established at 300 for each outgoing link 128, which allows the software to communicate through the link. The standard bonding module establishes a virtual IP address that is advertised to the outside world and is used by all applications on the server for communications (the applications are unaware that there are multiple physical links that may be able to communicate with the outside world).

At 302, the multi-subnet bonding software synchronizes with the standard bonding module to determine which link the bonding module will use as the primary link. The multi-subnet bonding software sends routing metric information at 304 to the attached HAIPE devices through the virtual gateways on a periodic basis. The primary link receives a low metric (e.g. 1) while the backup link receives a higher metric (e.g. 11). This in turn, allows the HAIPE devices to advertise route cost metrics to the networks they are supporting (in this case, both HAIPEs are supporting the same Plain Text (PT) subnet). Without these periodic route updates, HAIPE device 104 would not advertise its ability to protect the (PT) subnets.

In some embodiments, upon failure of the primary link at 306, the multi-subnet bonding software manipulates, at 308, the gateway the standard bonding module is using to direct data traffic out the alternate link. The standard bonding module then switches traffic to the backup link using the newly established gateway. The gateway manipulation is required because the physical links are attached to HAIPE devices 104 that are not on the same subnet. That is, they are on their own separate networks. Without this feature, failover would not work.

Upon switchover, the multi-subnet bonding software modifies the route metric and sends a triggered routing update at 310 to the HAIPE to lower the route metric (e.g. set to 1). Traffic that was destined to the now "out of service" link is now rerouted by HAIPE devices 104 as a result of a newly added failover feature in the HAIPE (ICMP-Destination Unreachable) or a Peer HAIPE Destination Unreachable Notification (PDUN) message depending on the conditions of the original link outage (a Cipher Text (CT) Black failure or a PT (Red) failure, respectively).

When the previously "out of service" link is restored, the standard bonding module marks it as a valid backup link. No communication occurs on that link, however, until such time as the current active link fails. To signal the HAIPE device 104 connected to the backup link, the multi-subnet bonding software (BOND0) sends a triggered routing update along with periodic updates with a routing metric that is higher than the primary link (e.g. 11).

When a switch 106 is inserted between the server or servers 108 and HAIPE device 104, a failure of the link between the switch/router 106 and the PT side of the HAIPE device 104 results in loss of traffic unless special software/scripting are utilized to augment the signaling path and react to failures.

Figure 11:
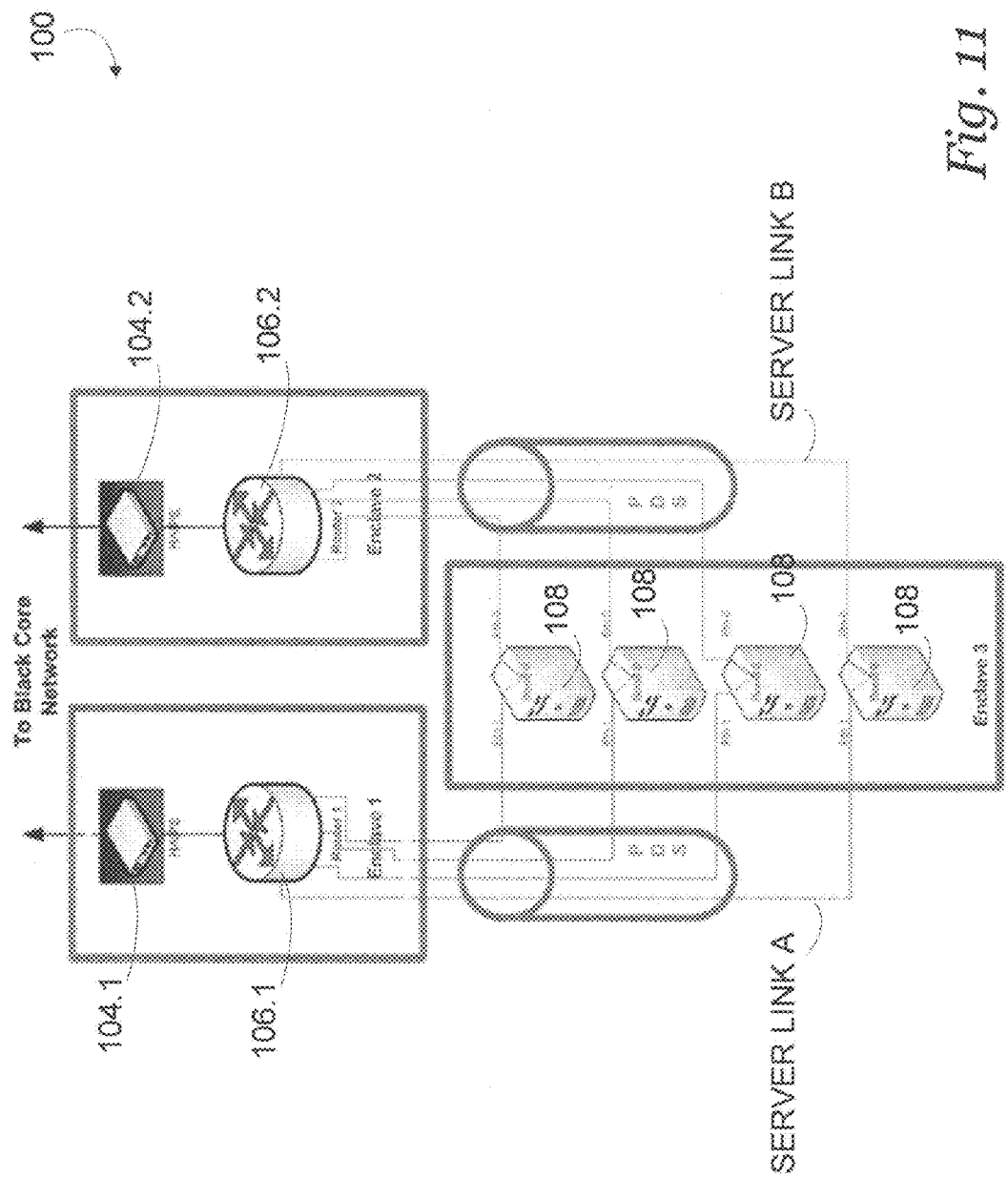
FIG. 11 illustrates one example method of recovering from link failures in a single uplink aggregation switch topology.

A single uplink aggregation switch topology is shown in FIG. 11. In the example topology of FIG. 11, one or more servers 108 are connected through routers 106 to HAIPE devices 104. In the embodiment shown in FIG. 11, Router/Switch 106 is responsible for updating the HAIPE device 104 with routing information indicating which PT subnets are active. There are three subnet link states that require processing:

A. All links alive
B. All links dead
C. A mix of alive and dead links

In case A, a link that is alive (has carrier) does not imply that the server attached to that link is capable of supporting data traffic. As noted in the discussion of server side changes above, this condition can occur when the server is using a bonding module in a primary/backup configuration. In such a mode, the bonding module (BOND0 in FIG. 9) only communicates out the active link; it never will communicate on the standby link. To determine the appropriate route metrics to send to the HAIPE device 104, in some embodiments, a software module within switch 106 "probes" the status of server 108 over the link. If the probe receives a response, this indicates that the link is alive and active. If the probe does not receive a response from the server, this indicates that the link is alive but in a standby mode and thus not able to send or receive data traffic. In some embodiments, if the link is alive but in a standby mode, software in router 106 manipulates the routing tables to send a high routing metric (e.g. 11) to the HAIPE device 104 indicating that this link is alive but it is a secondary path.

In case B, all links dead, there is no carrier. Router software updates HAIPE device 104 with a route metric (e.g. 16) indicating that the link is dead and that there is no path available.

In case C, where there is a mix of alive and dead links. In such a case, in some embodiments, router 106 examines each link and updates its routing table/metrics and the HAIPE routing table with the appropriate metric (e.g 16 if the link is dead, 11 if the link is alive but not responsive to the probe, and 1 if the link is alive and responds to the probe). This switch processing ensures that data traffic is only sent to links that are capable of supporting traffic. Without this software, switch/router 106 would normally send traffic to the link if the link was listed in its Address Resolution Protocol (ARP) cache.

In some embodiments, to ensure that the servers 108 attached to the router/switch 106 are in the proper state (particularly if they are configured for High Availability and using the multi-subnet bonding module software described above) router 106 translates any upstream failure into an actionable state. This is accomplished through event triggered software added to router 106. This software is event triggered (a capability of most modern switches) on the loss of the upstream link (in this case, PT link 128 to HAIPE device 104). When triggered, the event driven software downs all associated server links on switch 106. This in turn triggers the augmented bonding module on the server (BOND0) to promote the backup link to the active "primary" state and to send/receive data traffic to and from the newly promoted link With newly developed event triggered software, routers 106 can now react to upstream failures by reflecting that failure to the subtending networks by turning off the links associated with servers (typically a unique subnet/server)

It should be noted that although the router/switch event triggered software was developed specifically for working with HAIPE devices 104, this configuration also works in the absence of HAIPE devices, thus enabling failover of servers using "augmented" bonding that are attached to different networks.

Figure 12:
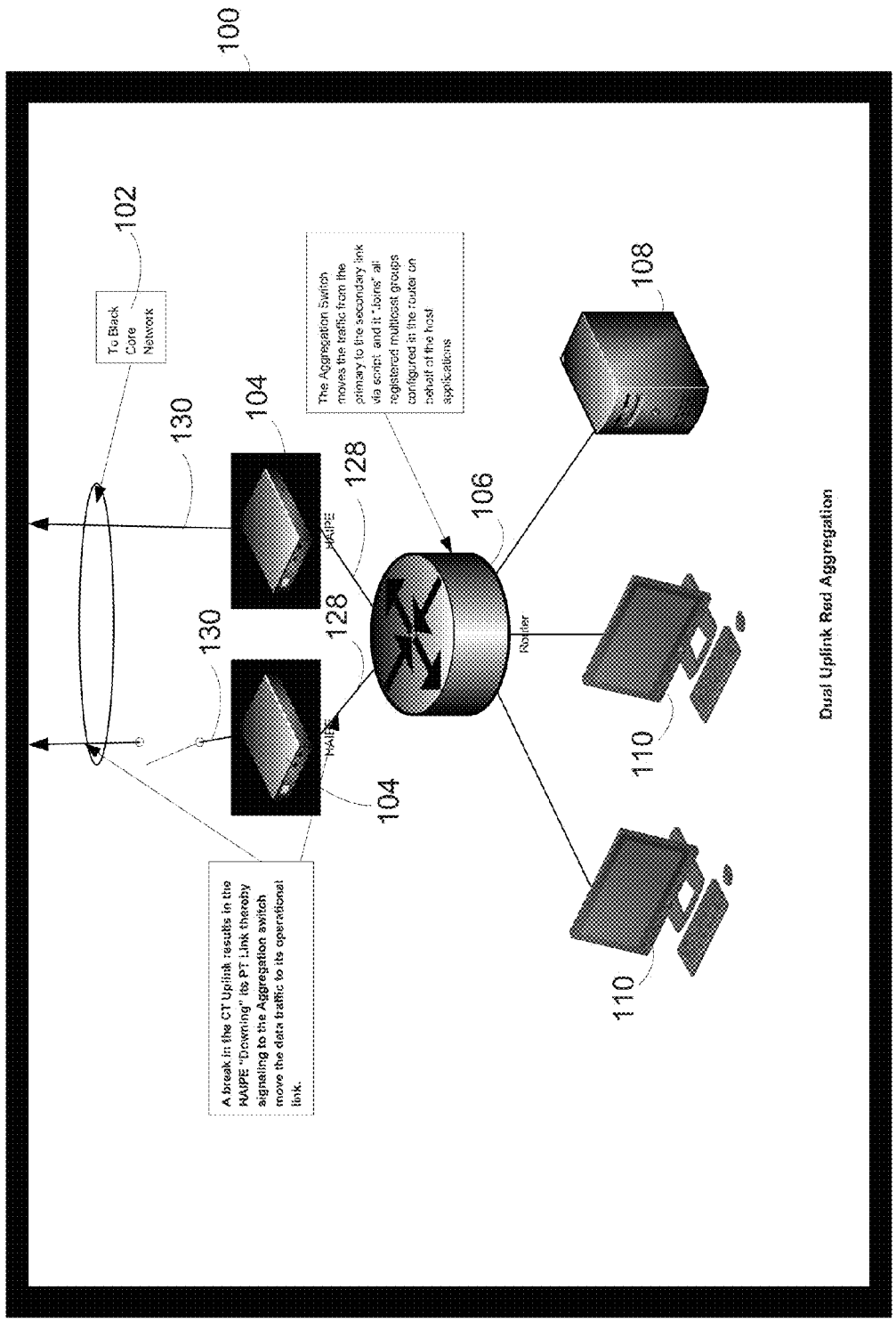
FIG. 12 illustrates a dual uplink aggregation switch topology.

A dual uplink aggregation switch topology is shown in FIG. 12. In the example topology of FIG. 12, one or more servers 108 are connected through routers 106 to HAIPE devices 104. In the embodiment shown in FIG. 12, Router/Switch 106 is responsible for updating the HAIPE device 104 with routing information indicating which PT subnets are active.

In one embodiment, the aggregation router/switch 106 updates the HAIPE devices 104 with equal metrics since all items connecting to the router are single point connections. However, having two active links routing out through separate networks to the Black Core can be problematic when it comes to multicast traffic. When a host or server connected to this switch joins a multicast group, it is possible for that multicast traffic to arrive on both uplinks resulting in duplicate packets. Furthermore, there are scenarios where sending multicast traffic can result in a loop where the outgoing multicast on one link gets routed back in the second link.

To mitigate this situation and provide proper failover, router 106 includes event triggered software. Upon the detection of a primary uplink failure, the event triggered software takes on the responsibility of rejoining the multicast streams. This is done to alleviate the necessity for applications resident on host systems connected to the Aggregation switch 106 from having to re-join the multicast streams they were previously subscribed to before the link failure. If this process was not followed, each and every application would have to be responsible for the detection of the loss of the multicast traffic and for restarting the multicast traffic by issuing an explicit multicast join request after the failover.

In some embodiments, when the link is restored, the restoration event is detected and triggers the software to block all incoming multicast traffic and turn off multicast on the link to prevent multicast outgoing traffic. This prevents situations where both links (being active) can receive multicast traffic and hence duplicate packets are avoided. In addition, this also prevents the multicast traffic from going out the backup link and being received on the active link.

In some embodiments, the link fails back to the primary link if that link comes back (revertive mode) while, in other embodiments, the link remains with its current link even if the former primary link comes back on line (nonrevertive mode).

Figure 13:
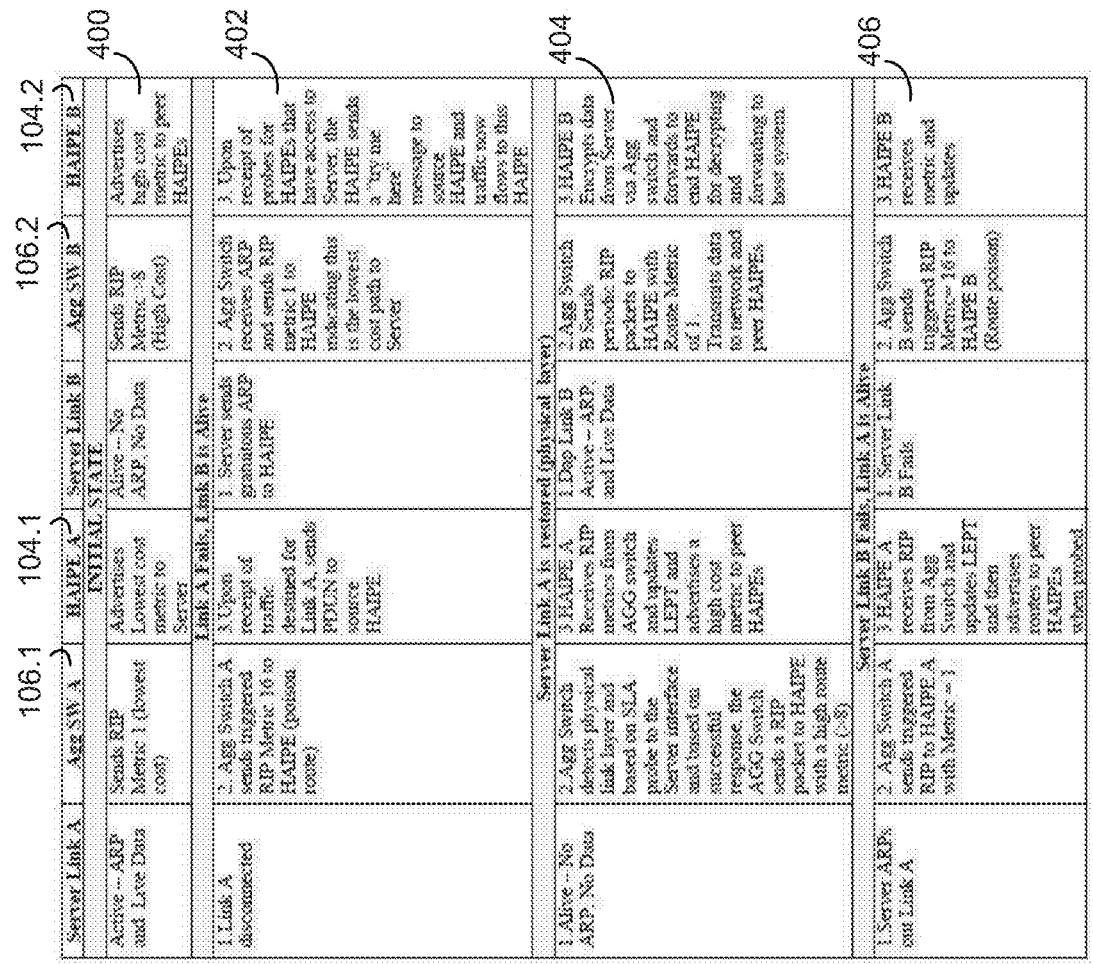
FIG. 13 illustrates one example method of recovering from link failures in a dual uplink aggregation switch topology.

An example sequence of events tracking link failure and recovery in network 100 of FIG. 11 is shown in FIG. 13. In the example shown in FIG. 13, at 400 Server Link A has been selected as the primary link and Server Link B has been designated the backup link. Switches A and B send the appropriate metrics; HAIPE A recognizes that it is the primary link and advertises to its peer HAIPEs that it has the lowest cost path to the Server. HAIPE B, on the other hand, recognizes that it is the backup link and advertises that it has the highest cost path to the Server.

At 402, Link A Fails and Switch A sends a triggered RIP with a high metric to HAIPE A. This poisons the route. Any subsequent traffic from CT link 130 designating Link A causes HAIPE A to transmit a PDUN to the source of the traffic. At the same time, the multi-subnet bonding software in Server 108 manipulates the gateway the standard bonding module is using to direct data traffic out the primary link to now cause it to transmit on Server Link B. Server 108 then sends a gratuitous ARP to Switch B. Switch B receives the ARP and sends a RIP with a low cost metric to HAIPE B. HAIPE B subsequently receives probes from other HAIPEs for HAIPEs that are attempting to send unicast traffic to Server 108. In response, HAIPE B sends a "try me here" message to the source of the probes and incoming unicast traffic now flows through Link B.

At 404, Link A is restored. As noted above, in some embodiments, a restored link becomes the new backup link. That is what happens here. Switch A detects physical link layer from the link to Server 108, sends an SLA probe to the Server interface and, based on a successful response, AGG Switch A sends a RIP packet to HAIPE A with a high route metric (e.g., >8). HAIPE A Receives the RIP metrics from AGG switch A, updates LEPT and advertises a high cost metric to peer HAIPEs.

In the meantime, LINK B remains as the primary link. AGG Switch B sends periodic RIP packets to HAIPE B with Route Metric of 1 and HAIPE B transmits data to the network and peer HAIPEs advertising that it provides the lowest cost route. HAIPE B also encrypts data from Server

108 via AGG switch B and forwards to the encrypted data to an end HAIPE for decrypting and forwarding to a host system.

At 406, Link B Fails and Switch B sends a triggered RIP with a high metric to HAIPE B. This poisons the route. Any subsequent traffic from CT link 130 designating Link B causes HAIPE B to transmit a PDUN to the source of the traffic. At the same time, the multi-subnet bonding software in Server 108 manipulates the gateway the standard bonding module is using to direct data traffic out the primary link to now cause it to transmit on Server Link A. Server 108 then sends a gratuitous ARP to HAIPE A. Switch A receives the ARP and sends a RIP with a low cost metric to HAIPE A. HAIPE A subsequently receives probes from other HAIPEs for HAIPEs that have access to Server 108. In response, HAIPE A sends a "try me here" message to the source of the probes and incoming unicast traffic now flows through Link A.

Figure 14:
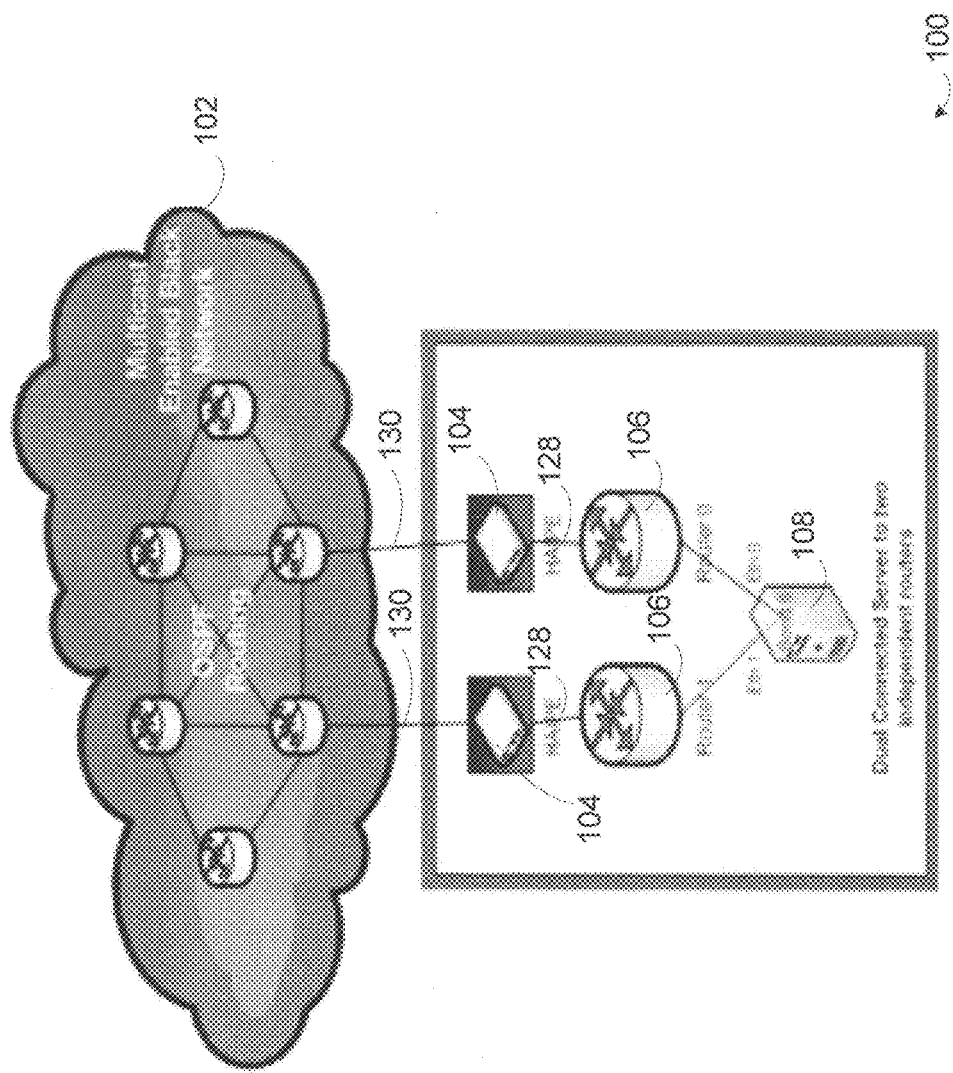
FIG. 14 illustrates a Dual Single-Uplink Red Aggregation Topology network.

A Dual Single-Uplink Red Aggregation Topology network 100 is shown in FIG. 14. In a Single-Uplink Red Aggregation Topology, the aggregation switch 106 provides only an aggregation function, taking data from multiple hosts and multiplexing the data up into a single data stream to network 102. Configured with just a single link, there is no failover mechanism possible. However, if one were to employ two Single-Uplink Red Aggregation switches 106 and dual connect servers 108 to them, a high availability configuration can be achieved as depicted in FIG. 14.

In the example embodiment of FIG. 14, the host (server 108) supports two network interfaces (eth0 and eth1) with each interface connected to a different Aggregation Switch 106. Since each Aggregation Switch 106 supports only a single uplink to the network 102, there are no "alternate" data paths for mission critical data from the Aggregation Switch 106 to network 102. Therefore, the failover responsibility is relegated to the server 108. This applies whether the failure results from the loss of communications with the Aggregation switch due to a failure of the server's Network Interface Card (NIC), a cable failure between the server and the Aggregation switch, or a failure between the Aggregation Switch and the HAIPE.

In the embodiment shown in FIG. 14, each Router/Switch 106 is responsible for updating the HAIPE device 104 with routing information indicating which PT subnets are active. There are three subnet link states that require processing:
 A. All links alive
 B. All links dead
 C. A mix of alive and dead links In case A, a link that is alive (has carrier) does not imply that the server attached to that link is capable of supporting data traffic. As noted in the discussion of server side changes above, this condition can occur when the server is using a bonding module in a primary/backup configuration. In such a mode, the bonding module (BOND0 in FIG. 9) only communicates out the active link; it never will communicate on the standby link. To determine the appropriate route metrics to send to the HAIPE device 104, in some embodiments, a software module within switch 106 "probes" the status of server 108 over the link. If the probe receives a response, this indicates that the link is alive and active. If the probe does not receive a response from the server, this indicated that the link is alive but in a standby mode and thus not able to send or receive data traffic. In some embodiments, if the link is alive but in a standby mode, software in router 106 manipulates the routing tables to send a high routing metric (e.g. 11) to the HAIPE device 104 indicating that this link is alive but it is a secondary path.

In case B, all links dead, there is no carrier. Router software updates HAIPE device 104 with a route metric (e.g. 16) indicating that the link is dead and that there is no path available.

In case C, where there is a mix of alive and dead links. In such a case, in some embodiments, router 106 examines each link and updates its routing table/metrics and the HAPIE routing table with the appropriate metric (e.g 16 if the link is dead, 11 if the link is alive but not responsive to the probe, and 1 if the link is alive and responds to the probe). This switch processing ensures that data traffic is only sent to links that are capable of supporting traffic. Without this software, switch/router 106 would normally send traffic to the link if the link was listed in its Address Resolution Protocol (ARP) cache.

In some embodiments, to ensure that the servers 108 attached to the router/switch 106 are in the proper state (particularly if they are configured for High Availability and using the multi-subnet bonding module software described above) router 106 translates any upstream failure into an actionable state. This is accomplished through event triggered software added to router 106. This software is event triggered (a capability of most modern switches) on the loss of the upstream link (in this case, PT link 128 to HAIPE device 104). When triggered, the event driven software downs all associated server links on switch 106. This in turn triggers the augmented bonding module on the server (BOND0) to promote the backup link to the active "primary" state and to send/receive data traffic to and from the newly promoted link With newly developed event triggered software, routers 106 can now react to upstream failures by reflecting that failure to the subtending networks by turning off the links associated with servers (typically a unique subnet/server).

As noted above, although the router/switch event triggered software was developed specifically for working with HAIPE devices 104, this configuration also works in the absence of HAIPE devices, thus enabling failover of servers using "augmented" bonding that are attached to different networks.

In some embodiments, in terms of probable failures, the connection between server 108 and Aggregation Switch 106 is significantly greater than the connection between Aggregation Switch 106 and HAIPE 104. This is because server 108 and the Aggregation Switches 106 could be physically separated by hundreds or thousands of feet whereas the Aggregation Switch 106 and the HAIPE 104 typically are co-located in the same enclave.

The Dual Connected server to multiple Single-Uplink Aggregation switches can be used in situations where geographical separation is required between the primary path and the secondary path.

What has been described herein is a true Black Core Network. Cooperative signaling mechanisms communicate link failures quickly. Server and switch/router augmentation enables triggered event handling as well as dynamic route manipulation. By using a combination of enhanced HAIPE failover features coupled with event triggered software modules augmenting switch operations, a highly resilient self-healing Red/Black Core Network has been achieved. In addition, under many failover scenarios, sub-second performance has been achieved demonstrated under full network loading scenarios.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, network 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. In a network in which a server includes a first and a second data path, wherein the first data path is through a first link to a first network interface and wherein the second data path is through a second link to a second network interface, a method of recovering from loss of one of the data paths, the method comprising:
   establishing, in a bonding module, a server gateway for each link;
   selecting the first link as primary link and the second link as backup link;
   sending routing metric information out through the primary link and the backup link, the routing metric information indicating that the cost of routing through the primary link is less than the cost of routing through the backup link;
   detecting a data path failure on the first data path;
   if a data path failure is detected on the first data path, manipulating the server gateway for the second link to direct traffic for the primary link out the second link, wherein the second link becomes the new primary link; and
   sending revised routing metric information out through the new primary link.

2. The method of claim 1, wherein the method further comprises:
   detecting that the first data path has been restored; and
   marking the restored first link as a valid backup link.

3. The method of claim 1, wherein the method further comprises:
   detecting that the first data path has been restored;
   manipulating the server gateway for the first link to direct traffic for the primary link out the first link, wherein the first link becomes the new primary link; and
   sending revised routing metric information out through the new primary link.

4. The method of claim 1, wherein detecting a data path failure on the first data path includes receiving an indication from the network connected to the first link that the first data path is down.

5. The method of claim 1, wherein detecting a data path failure on the first data path includes receiving an indication from a HAIPE device connected within the first data path that the first data path is down.

6. The method of claim 5, wherein each data path includes an aggregator configured in a single-uplink aggregation topology.

7. The method of claim 5, wherein each data path includes an aggregator configured in a single-uplink aggregation topology, wherein detecting a data path failure on the first data path includes reflecting a CT link failure back through the first link to the server.

8. The method of claim 7, wherein reflecting includes triggering bonding failover in the server.

9. An article comprising a nontransitory computer-readable medium having instructions thereon, wherein the instructions, when executed in a computing device, cause the computing device to perform a plurality of operations, the operations comprising:
   establishing, in a bonding module, a server gateway for each link of a plurality of links, the plurality of links comprising a first link to a first network interface and a second link to a second network interface;
   selecting the first link as primary link and the second link as backup link;
   sending routing metric information out through the primary link and the backup link, the routing metric information indicating that the cost of routing through the primary link is less than the cost of routing through the backup link;
   detecting a data path failure on a data path of the first link;
   if a data path failure is detected on the data path of the first link, manipulating the server gateway for the second link to direct traffic for the primary link out the second link, wherein the second link becomes the new primary link; and
   sending revised routing metric information out through the new primary link.

10. In a network in which a server is connected through a first and a second router to two separate networks, wherein the server is connected through a first link to the first router and through a second link to the second router, a method of recovering from loss of a link to one of the routers, the method comprising:
    establishing, in a bonding module, a server gateway for each link;
    selecting the first link as primary link and the second link as backup link;
    sending routing metric information out through the primary link and the backup link, wherein sending includes sending metric information indicating that the cost of routing through the primary link is less than the cost of routing through the backup link;
    receiving, from the first router, an indication that there is a link failure on the primary link;
    manipulating the server gateway for the second link to direct traffic for the primary link out the second link, wherein the second link becomes the new primary link; and
    sending routing metric information out through the new primary link to the second router.

11. The method of claim 10, wherein the method further comprises:
    detecting that the first link has been restored; and
    marking the restored first link as a valid backup link.

12. The method of claim 11, wherein each router includes event triggered software that blocks multicast traffic from the valid backup link.

13. The method of claim 10, wherein the second router automatically joins subscribed multicast groups when the second router receives routing is information through new primary link.

14. The method of claim 10, wherein the method further comprises:
   detecting that the first data path has been restored;
   manipulating the server gateway for the first link to direct traffic for the primary link out the first link, wherein the first link becomes the new primary link; and
   sending revised routing metric information out through the new primary link.

15. The method of claim 10, wherein detecting a link failure on the first link includes receiving an indication from the network connected to the first link that the first link is down.

16. The method of claim 10, wherein detecting a link failure on the first link includes receiving an indication from an encryptor connected to the first link that the first link is down.

17. The method of claim 10, wherein detecting a link failure on the first link includes receiving an indication from a HAIPE device connected to the first link that the first link is down.

18. The method of claim 17, wherein detecting a link failure on the first link includes receiving an indication from the first router that the CT link to the network is down.

19. The method of claim 10, wherein each router includes event triggered software that automatically tracks the primary link and blocks multicast traffic from the backup link.

20. The method of claim 10, wherein detecting a data path failure on the first data path inludes receiving an indication from an encryptor connected within the first data path that the first data path is down and updating routing tables within the encryptor to reflect that the first data path is down.

21. The method of claim 10, wherein detecting a data path failure on the first data path includes determining that a plaintext link on a HAIPE device is disabled and automatically clearing a plaintext network topology table within the HAIPE device.

22. The method of claim 10, wherein the method further comprises:
   detecting that the first link has been restored; and
   marking the restored first link as a valid backup link.

23. A system comprising:
   a ciphertext network;
   a server, wherein the server includes a bonding module and a plurality of network interfaces:
   a plurality of encryptor devices; and
   one or more routers, wherein each router is connected through one or more of the server network interfaces to the server and through one or more encryptor devices to the ciphertext network;
   wherein the server establishes, in the bonding module, a server gateway for each server network interface, selects a first network interface as primary link and a second server network interface as backup link, and sends routing metric information out through the primary link and the backup link, wherein sending includes sending metric information indicating that the cost of routing through the primary link is less than the cost of routing through the backup link;
   wherein the server receives, from one of the one or more routers, an indication that there is a link failure on the primary link, manipulates the server gateway for the second server network interface to direct traffic for the primary link out the second server network interface, wherein the second link becomes the new primary link; and
   wherein the server sends routing metric information out through the new primary link to the second router.

24. The system of claim 23, wherein, in a dual uplink topology, each router includes event triggered software that automatically tracks the primary link and blocks multicast traffic from the backup link.

25. The system of claim 23, wherein the second router automatically joins subscribed multicast groups when the second router receives routing metric information through the new primary link.

26. The system of claim 23, wherein each router includes event triggered software that enables HAIPE routing table updates.

27. The system of claim 23, wherein each router includes event triggered software that enables dynamic routing updates.

* * * * *

UNITED STATES PATENT AND TRADEMARK OFFICE
CERTIFICATE OF CORRECTION

PATENT NO. : 9,491,122 B2
APPLICATION NO. : 14/516762
DATED : November 8, 2016
INVENTOR(S) : Morrison et al.

Page 1 of 1

It is certified that error appears in the above-identified patent and that said Letters Patent is hereby corrected as shown below:

In Column 11, Line 16, delete "100." and insert --102.--, therefor

In Column 11, Line 22, delete "100," and insert --102,--, therefor

In Column 18, Line 66, in Claim 13, delete "is" and insert --metric--, therefor

In Column 18, Line 66, in Claim 13, before "new", insert --the--

In Column 19, Line 29, in Claim 20, delete "inludes" and insert --includes--, therefor Signed and Sealed this
Seventeenth Day of April, 2018

Andrei Iancu
*Director of the United States Patent and Trademark Office*